US00RE42259E

(19) United States
(12) Reissued Patent
Campbell et al.

(10) Patent Number: US RE42,259 E
(45) Date of Reissued Patent: Mar. 29, 2011

(54) BIOLOGICALLY-DOMINATED ARTIFICIAL REEF

(76) Inventors: Matthew D. Campbell, Austin, TX (US); Steven G. Hall, Baton Rouge, LA (US); Robert L. Beine, Lancaster, KY (US)

(21) Appl. No.: 12/323,686

(22) Filed: Nov. 26, 2008

Related U.S. Patent Documents

Reissue of:
(64) Patent No.: 7,144,196
Issued: Dec. 5, 2006
Appl. No.: 11/321,874
Filed: Dec. 28, 2005

U.S. Applications:
(60) Provisional application No. 60/737,145, filed on Nov. 15, 2005.

(51) Int. Cl.
*E02B 3/04* (2006.01)
*A01K 61/00* (2006.01)

(52) U.S. Cl. ..... 405/30; 405/21; 405/25; 119/221; 119/234; 119/238

(58) Field of Classification Search ..... 405/21, 405/22, 23, 25, 30, 31, 33, 34, 35; 119/221, 119/234, 238
See application file for complete search history.

(56) References Cited

U.S. PATENT DOCUMENTS

| | | | | | |
|---|---|---|---|---|---|
| 2,474,786 | A | * | 6/1949 | Humphrey | 405/30 |
| 2,514,119 | A | * | 7/1950 | Boccia | 405/21 |
| 3,176,468 | A | * | 4/1965 | Nagai et al. | 405/29 |
| 3,309,876 | A | * | 3/1967 | Potter | 405/35 |
| 4,083,190 | A | * | 4/1978 | Pey | 405/33 |
| 4,840,516 | A | * | 6/1989 | Rambo | 405/33 |
| 4,856,935 | A | * | 8/1989 | Haras | 405/35 |
| 4,993,362 | A | * | 2/1991 | Jimbo | 119/221 |
| 5,071,285 | A | * | 12/1991 | Van Doren | 405/25 |
| 5,122,015 | A | * | 6/1992 | Shen | 405/284 |
| 5,269,254 | A | | 12/1993 | Gagliano et al. | |
| 5,536,112 | A | | 7/1996 | Oertel, II | |
| 5,620,280 | A | | 4/1997 | Melby et al. | |
| 5,803,660 | A | * | 9/1998 | Warren et al. | 405/25 |
| 6,464,429 | B2 | | 10/2002 | Moore | |
| 6,712,024 | B1 | | 3/2004 | Hall | |
| 6,824,327 | B1 | | 11/2004 | Walter | |
| 6,896,445 | B1 | | 5/2005 | Engler | |
| 7,144,196 | B1 | | 12/2006 | Campbell et al. | |
| 2003/0094141 | A1 | | 5/2003 | Davis | |

OTHER PUBLICATIONS

Campbell, M et al., "Analysis and evaluation of Bioenginnered Submerged Breakwater", (published thesis) on file with the Lousisiana State University Library, Dec. 2004.

* cited by examiner

*Primary Examiner*—Frederick L Lagman
(74) *Attorney, Agent, or Firm*—Thomas & Karceski, P.C.

(57) ABSTRACT

An apparatus and method of reducing the effects of hydrodynamic forces of waves and water currents in coastal environments (e.g., oceans, and coastal, river, lake, and reservoir banks). The apparatus is an oysterbreak having two basic designs adapted to allow for the attachment of oysters and other bio-fouling marine organisms, using the least amount of material. In one embodiment, the oysterbreak comprises a support structure and plurality of slats (i.e., relatively planar sections or surfaces) having growth layers made from tubing coated with a material capable of inducing aquatic sessile organism attachment and growth. In another embodiment, the oysterbreak comprises a plurality (e.g., two, three, four, five, six, etc.) of growth layers of regular polygonal-shaped members made from a material capable of inducing aquatic sessile organism attachment and growth that when stacked, form a relatively portable, breakwater module.

37 Claims, 24 Drawing Sheets

BIOLOGICALLY-DOMINATED ARTIFICIAL REEF

Matter enclosed in heavy brackets [ ] appears in the original patent but forms no part of this reissue specification; matter printed in italics indicates the additions made by reissue.

The application claims benefit from U.S. Provisional Application No. 60/737,145 filed Nov. 15, 2005.

This invention pertains to artificial reefs, particularly a transportable, modular apparatus and method of effectively reducing the effects of hydrodynamic forces of waves and water currents in coastal environments (e.g., ocean, coastal, river, lake, and reservoir banks).

The Louisiana coastline has received national attention due to its rapid erosion rates. Erosion projections based on historic rates of erosion along the coastline of Louisiana have increased from approximately 60 $km^2$ per year in 1997 to approximately 100 $km^2$ per year in 2000, with an additional estimated lose of 1,327 $km^2$ by 2050. Although erosion occurs in most coastal areas, it is estimated that Louisiana suffers from the highest erosion rates in the nation, accounting for approximately 90% of the total coastal marshes lost. Several parameters have been found to contribute to these high erosion rates, including subsidence, that is, the gradual decrease in coastal elevation when soft soils consolidate, the frequent occurrence of hurricanes in the Gulf of Mexico, and past anthropogenic activities such as the fabrication of levees and water diversions. The disappearance of the coastal areas jeopardizes public and private infrastructures, oil and gas infrastructures, property values, and standards of coastal living. See S. J. Williams, et al., "A perspective on the Louisiana wetland loss and coastal erosion problem," Journal of Coastal Research, vol. 13, no. 3, pp. 593–594 (1997); J. M. Coleman, et al., "Mississippi River Delta: an Overview," Journal of Coastal Research, vol. 14, no. 3, pp. 698–716 (1997); J. Barras, et al., Historical and Projected Coastal Louisiana Land Changes: 1978–2050: USGS Open File Report 03–334, p. 39 (2003); and U.S. Army Corps of Engineers, "Ecosystem Restoration Study," Louisiana Coastal Area Study, vol. 1, New Orleans District (2004).

Louisiana's coastal area is made up of the Deltaic and the Chenier Plains, which are greatly influenced by the Mississippi and the Atchafalaya Rivers. Wetlands, muddy coastlines, and low-sloped areas dominate the coastal environment of Louisiana. These types of fragile coastal zones are vulnerable to extreme wave action. For example, during winter, cold winds from inland often create high frequency waves in areas not typically accustomed to such wave actions, which can cause major damage to the inland side of barrier islands and bay areas. See J. M. Coleman, et al. 1997; and G. W. Stone, et al., "Overview and Significance of Hurricanes on the Louisiana Coast, U.S.A.," Journal of Coastal Research, vol. 13, no. 3, pp. 656–669 (1997).

A diverse ecosystem thrives in the Louisiana coastal environments, including large populations of fish, which rely on the nutrients and nursery grounds provided by this estuarine environment. The extensive coastal wetlands in Louisiana also provide protection for densely populated cities during tropical storms and hurricanes. This ecosystem is in danger of eroding into the Gulf of Mexico.

Attempts to impede coastal erosion have been made throughout south Louisiana's coast, using various low cost methods, including the placement of objects such as old Christmas trees, automobile tires, sand bags, plants, and coastal mats. These methods were not engineered to stop erosion because, at the time, the natural processes of erosion were not understood. In fact, in some cases, these methods might increase the erosion rates. In addition, most of these techniques cannot withstand harsh coastal environments (e.g., wires inside tires corrode and dissolve into the water causing pollution and boating hazards).

Another technique for reducing erosion and restoring coastlines involves placing submerged breakwaters, also referred to as reef breakwaters, near the coastline to divert wave energy away from the coastline. Natural reefs made up of oyster reefs may divert wave energy away from coastlines. Oyster reefs are submerged habitats found in the southern region of the United States, near shores and estuaries. Oyster reefs are built primarily by the eastern oyster, Crassostrea virginica, through successive reproduction and settlement of larvae onto existing reef structures, and are known to form immense structures able to protect shorelines and coastal communities from storms by reducing wave energy. Historically, oyster reefs have lined Louisiana's coast and have provided a lucrative shellfish industry. Oyster reefs have also provided shelter to many marine organisms such as fish, crabs, and barnacles, and have stabilized the salt marshes of Louisiana. Although there are extensive reefs in coastal Louisiana, many areas have been harvested without replenishment. Consequently, areas now devoid of oyster reefs, such as Vermilion Bay, La., are experiencing increased levels of erosion. Some drawbacks associated with the use of oyster reefs include susceptibility to disease and predation due to their proximity to the sea bottom. See L. BAHR, Personal Communication (September, 2002); and S. E. Shumway, Natural Environmental Factors, in: Kennedy, et al., (Eds.) The Eastern Oyster Crassostrea virginica, pp. 467–513 (Maryland Sea Grant College, University of Maryland System, College Park, 1996).

Another method of reducing coastal erosion is to reduce the power and size of waves by interfering with the underwater portions of the waves to dissipate the energy, using artificial reefs made from material such as rocks. Artificial reefs mitigate the ability of waves to erode a beach and help to provide comparatively still waters between the reefs and the coastline. A major drawback associated with the use of artificial reefs made from rocks is that the reefs have to be constructed in high density. Another drawback involves the expense and difficulty setting rocks to form an artificial reef.

WO 0136751A1 describes a device for protecting coasts and forming a breakwater barrier, comprising a series of basic modules having at least one float setting under tension and a submerged sail.

U.S. Pat. No. 5,620,280 describes a device for protecting ocean, coastal, river, lake and reservoir banks from damaging hydrodynamic forces of waves and water currents, comprising a module having a central elongate concrete member and two outer elongate concrete members, all of which have uniformly-tapered polygonal cross-sections. The two outer members are connected with the central member on opposite sides thereof. The outer members have central axes extending from the longitudinal axis of the central member. The elongate members are configured such that their cross-sectional area decreases from an intermediate portion toward opposite ends thereof to promote a high degree of wedging. In a particular embodiment, the elongated concrete members have octagonal cross-sections and the longitudinal axes of the outer members are normal to the longitudinal axis of the central member.

U.S. Pat. No. 5,536,112 describes a device for distributing wave forces along the entire length of the device, and shielding shorelines from the destructive energy of incoming waves, comprising a cylindrical modular caisson made of reinforced concrete, mounted on a platform for stability and support and positioned side-by-side with like modules to form a hollow core and high profile breakwater. The seaward facing lower section of each module has an inclined ramp that absorbs reflected wave energy and inhibits tow scour. Precast wafers of concrete can be added or removed from the caisson modules as required for ballast.

U.S. Pat. No. 5,269,254 describes an apparatus and method of forming an oyster reef, comprising the steps of setting seed oysters on cultch material, placing the cultch material containing the seed oysters in water permeable panels to form a vertical permeable wall of cultch material through which water may flow, and placing the panels in water having favorable conditions for oyster growth. The apparatus includes water permeable panels for holding cultch material in a vertical, permeable wall to expose the entire column or wall of cultch to water having favorable conditions for oyster growth, and blocks formed from the panels.

An unfilled need exists for an inexpensive, transportable modular apparatus and method of effectively reducing the effects of hydrodynamic forces of waves and water currents in coastal environments (e.g., oceans, and coastal, river, lake, and reservoir banks).

We have discovered an inexpensive apparatus and method of effectively reducing the effects of hydrodynamic forces of waves and water currents in coastal environments (e.g., oceans, and coastal, river, lake, and reservoir banks). The apparatus also enhances environmental conditions by using native organisms as part of its structure. The apparatus is an oysterbreak having two basic designs adapted to provide a large amount (relative to the volume of solids) of surface area for allowing the attachment of oysters and other biofouling marine organisms, with the least amount of material. As the oysters grow, the structure increases in density. In one embodiment, the oysterbreak comprises a support structure and plurality (e.g., two, three, four, five, six, etc.) of growth layers sized and shaped to form one or more slats (i.e., relatively planar sections or surfaces). The slats are attached to the support structure to form a breakwater. In this embodiment, the growth layers are made from tubing (e.g., PVC tubing, FRENCH tubing, and concrete bars) coated with a material capable of inducing aquatic sessile organism attachment and growth such as mortar or nutrient-enhanced concrete. The spacing between each growth layer is adapted to provide an optimum surface area for inducing aquatic sessile organism growth. The number of slats and distance between each slat are adapted to form a coastal barrier able to allow for the transmittance and redirection of wave energies passing through wave ports formed between the growth layers at levels sufficient to achieve pre-specified wave dissipation objectives.

In another embodiment, the oysterbreak comprises a plurality (e.g., two, three, four, five, six, etc.) of growth layers. The growth layers are formed by regular polygonal-shaped members (i.e., a polygon that has equal sides such as a regular triangle, regular quadrilateral, regular pentagon, regular hexagon, regular heptagon, and regular octagon) made from a material capable of inducing aquatic sessile organism attachment and growth (e.g., mortar, concrete, and biomass such as cottonseed, soybean, milo, agriculture waste, fertilizer, and mulch) that when stacked, form a relatively portable, lightweight module. In this embodiment, the number of growth layers depends on design wave height and wave frequency. Spacers are used to stack the growth layers on top each other at a distance adapted to provide an optimum surface area for aiding aquatic sessile organism growth. The growth layers are adapted to form one or more slats able to provide a coastal barrier for transmitting and redirecting wave energies passing through wave ports formed between the growth layers at levels sufficient to achieve pre-specified wave dissipation objectives. In a preferred embodiment, the members are regular hexagonally-shaped and form a total of six slats (three slats are depicted when viewing from a side perspective). Depending on the depth of the water, soil strength, and desired wave dissipation, modules may be stacked on top each other, placed side by side, or staggered to direct waves through wave ports formed between the growth layers at levels sufficient to achieve pre-specified wave shoaling (i.e., decreasing the amount of energy in a wave, while altering its direction) objectives. Alternatively, two or more single, regular hexagonally-shaped members are placed side by side at a distance adapted to provide wave ports between each adjacent member. One or more additional rows may be formed by stacking a single member over each wave port in the preceding row to reach a pre-specified breakwater height.

Both designs are able to sufficiently reduce the erosion of coastlines and to foster the growth of aquatic sessile organisms (e.g., oysters, mussels, barnacles, and corals).

Figure 1:
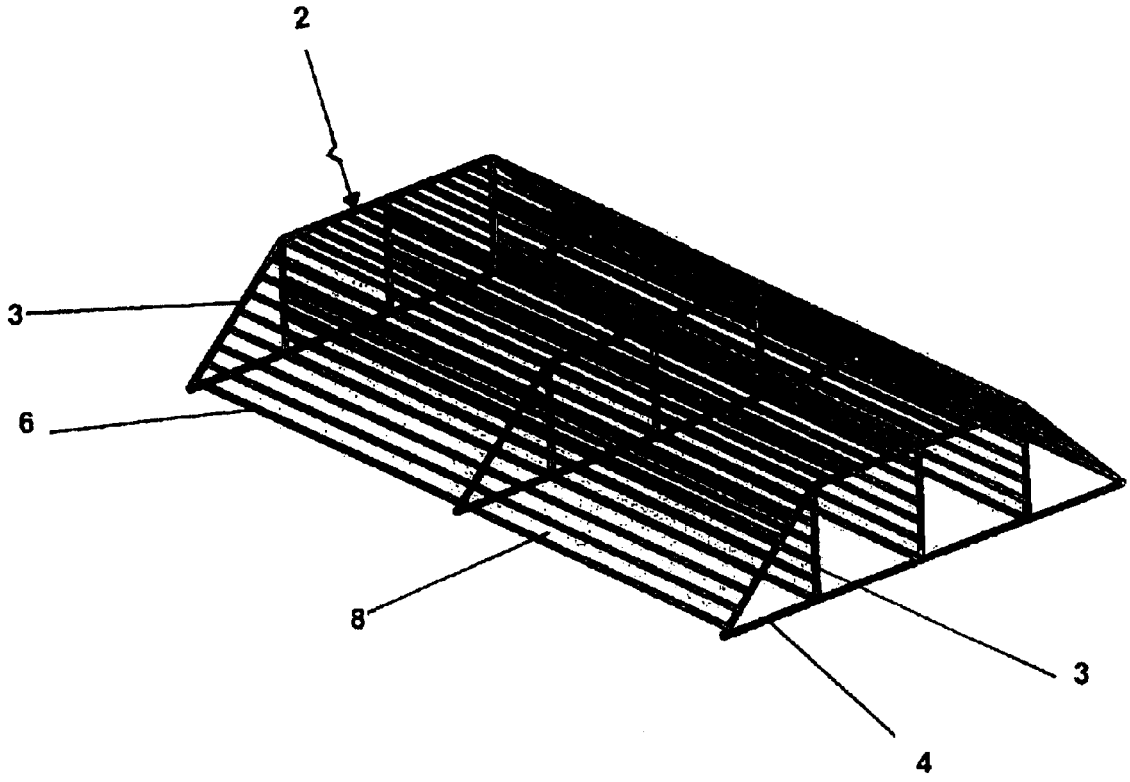
FIG. 1 is a perspective view of one embodiment of a tube-based oysterbreak.

The general purpose of this invention is to provide inexpensive, modular apparati that can be placed in multiple configurations to enhance the overall performance of breakwaters. The invention may be used to sufficiently reduce the erosion of coastlines and to foster the growth of aquatic sessile organisms (e.g., oysters, barnacles, and corals). In one embodiment, the oysterbreak comprises a support structure and a plurality (e.g., two, three, four, five, six, etc.) of growth layers sized and shaped to form one or more slats (i.e., relatively planar sections or surfaces). The slats are placed onto the support structure to form a breakwater. In this embodiment, the growth layers are a plurality of tubing (e.g., PVC tubing or FRENCH tubing) coated with a material capable of inducing aquatic sessile organism attachment and growth such as mortar, and placed adjacent to each other at a distance and orientation (e.g., horizontal or vertical) adapted to provide an optimum surface area for inducing aquatic sessile organism growth and wave energy reduction. The number of slats and distance between each slat are adapted to form a coastal barrier able to allow for the transmittance and redirection of wave energies passing through wave ports formed between the growth layers at levels sufficient to achieve pre-specified wave shoaling objectives.

In another embodiment, the oysterbreak comprises a plurality (e.g., two, three, four, five, six, etc.) of growth layers of regular polygonal-shaped members that, when stacked, form a relatively portable, lightweight module. In this embodiment, the growth layers are coated with a material capable of inducing aquatic sessile organism attachment and growth (e.g., mortar, concrete, and biomass such as cottonseed, soybean, milo, agriculture waste, fertilizer, and mulch) as explained more fully below. Spacers are used to stack the growth layers on top each other at a distance adapted to provide an optimum surface area for aiding aquatic sessile organism growth. The shape of the growth layers is adapted to form slats able to provide a coastal barrier for reducing and redirecting wave energies passing through wave ports formed between the growth layers at levels sufficient to achieve pre-specified wave shoaling objectives. In a preferred embodiment, the members are regular hexagonally-shaped with triangular openings. Each member forms six slats (a slat is form at each side of the hexagonally-shaped member). Alternatively, two or more single, hexagonal-shaped members are placed side by side at a distance adapted to provide wave ports between each adjacent member. The size of the wave ports is adapted to allow for the transmittance and redirection of wave energies passing through the oysterbreak to achieve pre-specified wave dissipation objectives. One or more additional rows may be formed by stacking a member over each wave port in the preceding row to reach a pre-specified breakwater height.

There are several advantages to using this device as a breakwater. First, the number of components is minimal. Fabrication is simple and inexpensive. Second, the oysterbreak is relatively lightweight and may be dismantled for convenient storage and transport, adaptation, re-orientation, relocation or removal when required. Third, the weight of the oysterbreak is variable, which allows it to be made lighter for use in muddy bottom environments, or heavier when required for resistance to wave forces, without jeopardizing the integrity of the system structure. Forth, the growth layers may be made from different materials having different physical characteristics, such as density, porosity, and permeability. Fifth, the design may be modified, depending on the soil strength, by either changing the material in which the growth layers are made or by reducing the number of growth layers. Sixth, the design provides an optimal habitat for fish to feed and breed by creating a viable habitat for marine organisms and submerged aquatic vegetation and by providing a breeding and feeding ground for the marine organisms, which improves the water quality for surrounding vegetation to thrive. Finally, breakwater effects are improved by stimulating oyster growth in a configuration that effectively dissipates wave energy.

EXAMPLE 1

The following is a tube-based oysterbreak 2 comprising a support structure 4 and growth layers 6 adapted to form slats 3 (i.e., horizontal growth layers that form a relatively planar surface) attached to support structure 4 to form a breakwater having an extruded trapezoidal shape, with a top crest width smaller than the base crest width, in accordance with this invention. See FIG. 1. In this embodiment, growth layers 6 are a plurality of tubing made from a material having non-toxic properties (i.e., a material that would not harm sea animal if ingested or absorbed) and a high rate of chemical stability (i.e., a chemical that would not decompose in saltwater) such as schedule 80 PVC purchased from Home Depot, Baton Rouge, La. Growth layers 6 were coated with a material capable of inducing aquatic sessile organism attachment and growth such as a mortar (e.g., FLEXBOND™), and placed adjacent to each other at a distance and orientation (e.g., horizontal or vertical) adapted to provide an optimum surface area for inducing aquatic sessile organism growth. In a preferred embodiment, growth layers 6 were coated with a novel nutrient-enhanced mixture comprising concrete and biomass materials (e.g., cottonseed, soybean, milo, agriculture waste, fertilizer, and mulch) able to form nutrients that attract oysters such as ammonia, as more fully explained below. The number of slats 3 and distance between each slat 3 was adapted to form a coastal barrier able to allow for the transmittance and redirection of wave energies passing through wave ports 8 formed between growth layers 6 at levels sufficient to achieve pre-specified wave dissipation objectives. In this embodiment, two slats 3 were used. Other embodiments may include a plurality (e.g., one, three, four, five, etc.) of slats 3. As discussed in Example 5, the optimum amount of slats 3 per meter is 2.30 (9.21 slats per meter when using a 1 to 4 length scale as explained below).

EXAMPLE 2

Figure 2A:
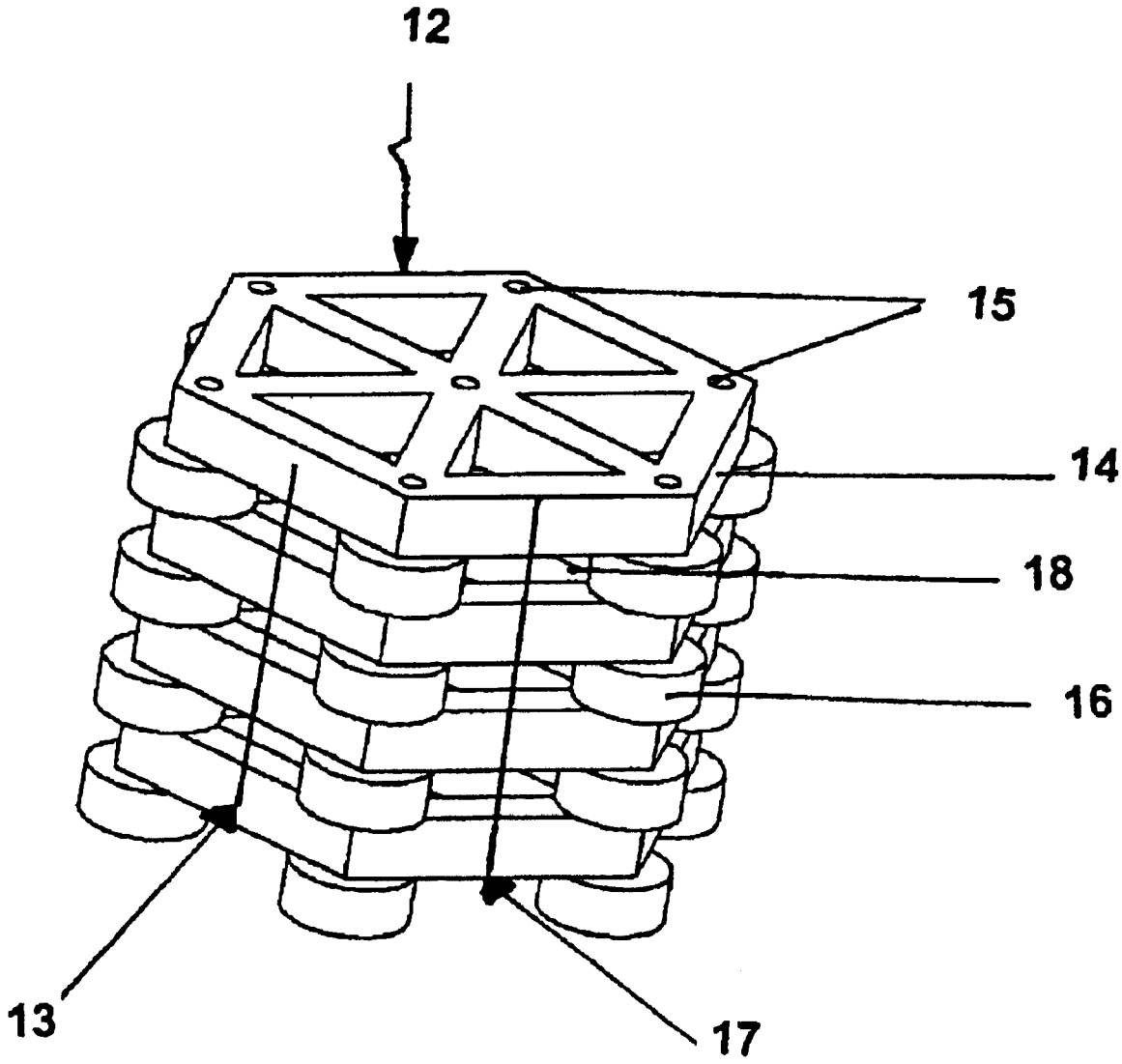
FIG. 2A is a perspective view of hexagonally-shaped members stacked to form one embodiment of a module oysterbreak.

FIG. 2A is a perspective view of one embodiment of a module oysterbreak 12 comprising four growth layers 14 per side of each polygonal-shaped member, in accordance with this invention. Other embodiments may contain a plurality of growth layers (e.g., two, three, four, five, six, etc.). In this embodiment, growth layers 14 were made from mortar or concrete and an organic material capable of producing ammonia during biodegradation to induce aquatic sessile organism attachment (e.g., cottonseed, soybean, milo, agriculture waste, fertilizer, and mulch) able to form nutrients that attract oysters such as ammonia, as more fully explained below. (The number of growth layers 14 depends on design wave height and wave frequency.) Spacers 16 were used to support and stack growth layers 14 on top each other at a distance adapted to provide an optimum surface area and porosity for aiding aquatic sessile organism growth. In a preferred embodiment, the module had a hexagonally-shaped cross-section that defined triangular-shaped openings (other opening shapes may be used e.g., square, rectangular, circular, etc.), and was adapted to form a coastal barrier comprising six slats (i.e., a planar surface formed by each row of growth layers 14; depicted using illustrative lines 13 and 17; only two slats are clearly shown), each slat having four horizontal growth layers 14, able to allow for the transmittance and redirection of wave energies passing through wave ports 18 formed between growth layers 14 at levels sufficient to achieve pre-specified wave dissipation objectives. See FIG. 2A. The center and ends of each corner of the hexagonally-shaped member contained through-holes 15. See FIG. 2B. Depending on the depth of the water, soil strength, and desired wave dissipation, modules 12 may be stacked on top each other (See FIG. 2A), placed side by side (not shown), or staggered to form a coastal barrier (not shown) able to allow for the transmittance and redirection of wave energies passing through wave ports 18 formed between growth layers 14 at levels sufficient to achieve pre-specified wave dissipation objectives. Alternatively, two or more single, hexagonal-shaped members are placed adjacent to each other at a distance adapted to provide wave ports 18 between each member. The size of wave ports 18 is adapted to allow for the transmittance and redirection of wave energies passing through module oysterbreak 12 to achieve pre-specified wave dissipation objectives. One or more additional rows may be formed by stacking a single member over each wave port 18 in the preceding row to reach a pre-specified breakwater height. See FIG. 2C.

EXAMPLE 3

Evaluation of Settlement Patterns on a Biologically-Dominated Submerged Breakwater Construction of the Prototype Tube-Based Oysterbreak To investigate biological settlement patterns of oysters, barnacles, and bryozoans on the prototype oysterbreak 2, and to determine how resilient oysterbreak 2 is when exposed to marine conditions (e.g., waves and corrosion effects), the prototype oysterbreak frame 4 was constructed from a material having nontoxic properties (i.e., a material that would not harm sea animal if ingested or absorbed) and a high rate of chemical stability (i.e., a chemical that would not decompose in saltwater) such as schedule 80 PVC. (Schedule 80 PVC pipe has a density of approximate 2.608 g/cm$^3$, compared to limestone, which has a density ranging from approximately 2.5 g/cm$^3$ to 2.8 g/cm$^3$.) Schedule 80 PVC 2 in (5 cm) nominal diameter pipes, purchased from Home Depot, Baton Rouge, La., were glued together to form an A-frame having dimensions of 1.5 m×4.0 m×5 m (height, width, length, respectively). Holes (not shown) having a diameter of 5 mm were drilled through the pipes at 10 cm intervals.

To prepare the prototype oysterbreak 2 for deployment, 80 FRENCH TUBES™ (Poly-Chlor Plastics Ind. Ltd, British Colombia, Canada) having a length of 1.75 m and a diameter of 25 mm were placed in Barataria Bay, La. for one week to allow for the development of a biological film containing bacteria and algae on the outer surface of the tubes. Next, the tubes were submerged in a tank with approximately 30 million oyster pediveligers for two weeks to induce the growth of spat (i.e., the spawn of an oyster or a similar mollusk) to a length of 1 mm. To minimize oyster mortality caused by desiccation, the tubes were attached to the PVC frame while the frame was underwater, using 25 cm ultraviolet-resistant ties, to form slats, each having a plurality of growth layers 6.

Deployment of the Prototype Oysterbreak

The prototype oysterbreak 2 was deployed in the Gulf of Mexico, at a location approximately 50 m from the northern side of Grand Isle, La. (1.6 km away from the United States Geological Survey (USGS) Hydrowatch site (USGS, 2004)—global position, 29°16'32"N latitude and 89°56'29"E longitude), from August, 2002 to July, 2003. The prototype oysterbreak 2 was located at global position, 29°12'28"N latitude and 89°2'15"E longitude. The water was approximately 2.2 m deep at high tide and had a tidal range of approximately 0.5 m. The temperature of the water ranged from 13° C. (in January) to 32° C. (in August), and had a salinity level of between about 22 ppt and about 25 ppt. (Hurricane Lili and Tropical Storm Isadore caused damage to this study site in early October 2002.)

EXAMPLE 4

Methods of Evaluating Biological Fouling Patterns

Submerged Breakwater Analysis

Oysterbreak 2 was removed from the waters of the Gulf of Mexico and inspected for any damage caused by predators (e.g., gastropods, polyclad flatworms, and crabs) on a monthly basis. One of the most destructive predators, the southern oyster drill (Strominata haemastoma), was found on oysterbreak 2 in large numbers (between about 20 and about 100) and were removed during each inspection to reduce the level of predation. Hundreds of oyster drills was also observed in the vicinity of oysterbreak 2 due to the presence of oysters, which caused high predation pressure (i.e., the level of predators, e.g., oyster drill, increased in proportion to the increase in prey, e.g., oysters), on the oysters trying to colonize the submerged oysterbreak 2.

In July 2003, oysterbreak 2 was removed from the Gulf of Mexico and brought to a laboratory at the Biological Engineering Department at Louisiana State University, Baton Rouge, La., to inspect the FRENCH TUBES™ and to conduct biological counts of various organisms growing thereon. The organisms were identified using the taxonomy process described in K. L. Gosner, Guide to Identification of Marine and Estuarine Invertebrates (The Newark Museum, Newwark, N.J., 2000). Five tubes 6 spaced approximately 30 cm apart were removed from each side of the structure and counted. The total number of oysters, oyster scars, barnacles and serpulids (tubeworms) were then counted on each tube 6. The percentage of bryozoans was estimated by counting the number of times the bryozoans intersected 3 cm spacings along a straight line on various transects along tubes 6.

Analysis of Temporal Spawning Patterns

Spat plates were used to estimate the proportional recruitment of oysters on oysterbreak 2 over a period of time, using a method of estimation similar to earlier studies of recruitment on natural oyster reefs. The spat plates were constructed from 20 cm×20 cm (length and width) quarry tiles purchased from Home Depot, Baton Rouge, La., and were placed between 3.8 cm PVC pipes to form vertical racks. These racks were then placed on both sides of oysterbreak 2, with the top of the racks positioned 36 cm below the water surface at low tide. These spat plates were inspected every two weeks, during the oyster spawning season, from March 2003 to August 2003. The plates were then returned to the laboratory and biological counts of oysters, oyster scars, barnacles, and bryozoans performed. The percent of coverage of bryozoans was estimated by counting the number of times an organism intersected a 1 $cm^2$ area of the smooth surfaces of the plates. See P. D. Banks, et al., "Hydrocarbon effects on fouling assemblages: the importance of taxonomic differences, seasonal, and tidal variation," Marine Environmental Research, vol. 53, pp. 311–326 (2002); J. Supan, "Evaluation of a Leased Oyster Bottom in Mississippi Sound," Gulf Research Reports, vol. 7, no. 3, pp. 261–266 (1983); and P. D. Banks, et al., "Hydrocarbon effects on fouling assemblages: the importance of taxonomic differences, seasonal, and tidal variation," Marine Environmental Research, vol. 53, pp. 311–326 (2002).

Flow, Material, and Height Experiments

Figure 3:
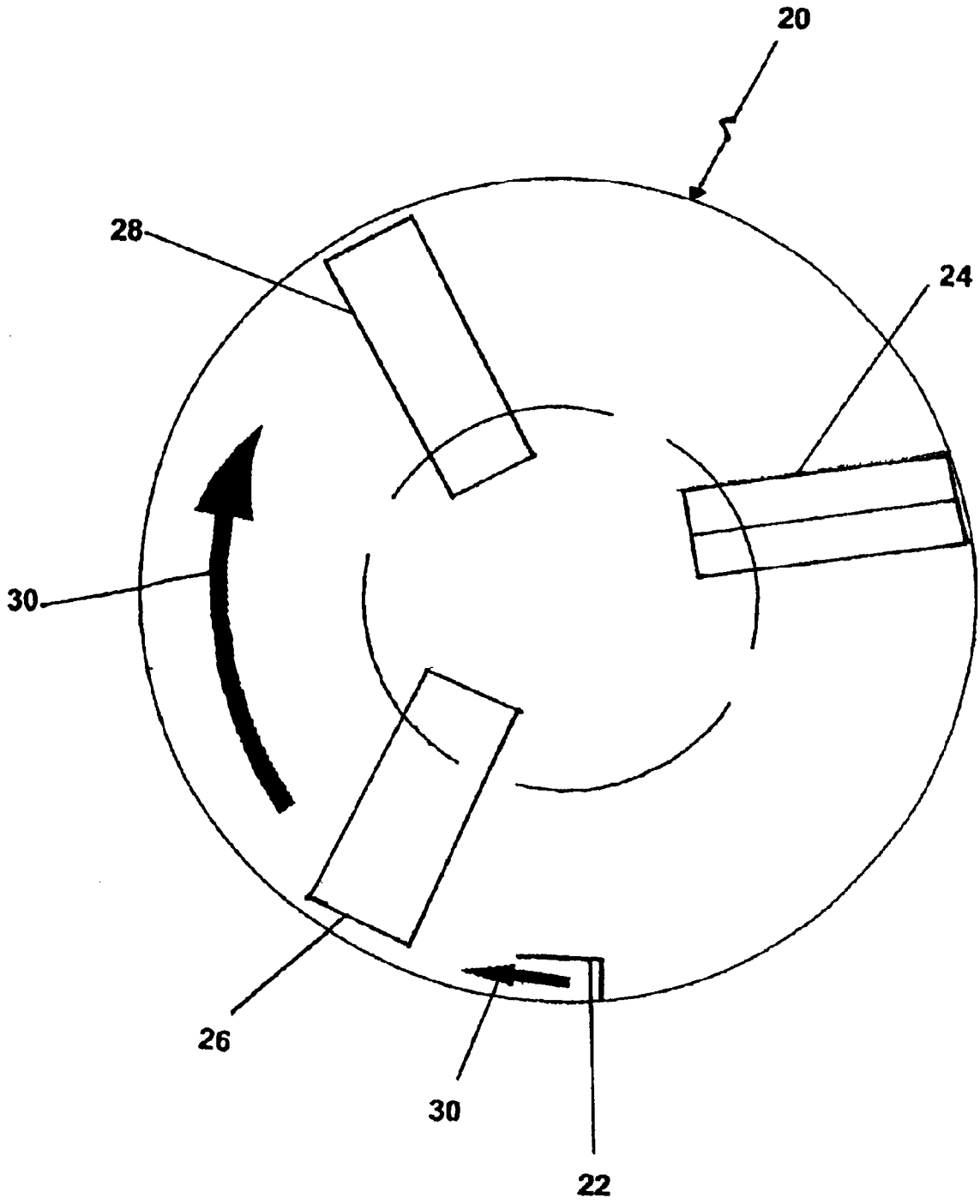
FIG. 3 is a schematic view of tank used for conducting predator exclusion experiments.

Additional experiments were conducted to determine the effects of materials, water flows, and heights on the distribution of spat settlements, using a 4.2 m dia tank 20 having a horizontal inlet 22 and a water level of 1.2 m. See FIG. 3. To correctly identify these factors, predators were excluded. Tank 20 was filled with sand-filtered bay water, having 23 ppt salinity, 8.64 pH, and an average temperature of 29° C., from the bay adjacent to the Louisiana State University Foundation hatchery in Grand Isle, La. These levels were similar to the environmental conditions in Barataria Bay, where oysterbreak 2 was located. Three 0.6 m×1.2 m×0.9 m (height, width, length, respectively) rectangular-shaped box frames were made out of 1 in (2.5 cm) nominal diameter schedule 40 PVC pipe purchased from Home Depot, Baton Rouge, La. The outside surface of the box frames were made from various materials used to form breakwaters (24, 26, and 28, respectively. Breakwater 24 was covered with PVC pipe coated with FLEXBOND™ mortar and schedule 40 PVC pipe, breakwater 26 was covered with FRENCH TUBES™, breakwater 28 was covered in black plastic mesh. Breakwaters (24, 26, and 28) were equally-spaced against the outer wall of tank 20 as shown in FIG. 3. Water flow (direction of flow is indicated by arrow 30) in the tank was measured at heights of 8 cm, 40 cm, 70 cm, and 90 cm from the bottom of tank 20, using a Marsh-McBirney portable water flow meter (model 201-D; Marsh-McBirney Inc., Fredrick, Md.). Water flow was also measured at various radial positions within tank 20, including a position at the wall of tank 20, 1 m away from tank 20, and in the center of tank 20. Breakwaters (24, 26, and 28) were left in tank 20 for three weeks, and then tank 20 was drained and breakwaters (24, 26, and 28) removed. Next, the materials (i.e., the black plastic mesh, schedule 40 PVC pipe, PVC pipe coated with FLEXBOND™ mortar, and FRENCH TUBES™) were removed from breakwaters (24, 26, and 28) at heights of 8 cm, 40 cm, 70 cm, and 90 cm from the bottom of tank 20. The mesh material was then cut into six 5 cm×120 cm sections and the FRENCH TUBES™ and PVC pipes were divided into four 0.3 m sections. The materials were then marked for identification. Next, four transects were randomly selected for each pipe. Oysters having a size greater than 1 mm in diameter that intersected each transect were counted, and the average number of oysters in each 0.3 m section calculated. The number of oysters found in each breakwater (24, 26, and 28) was then compared, based on pipe sections and heights, using a variance statistics analysis. An $\alpha$ value of 0.05 was chosen as the statistical significance value.

Figure 4:
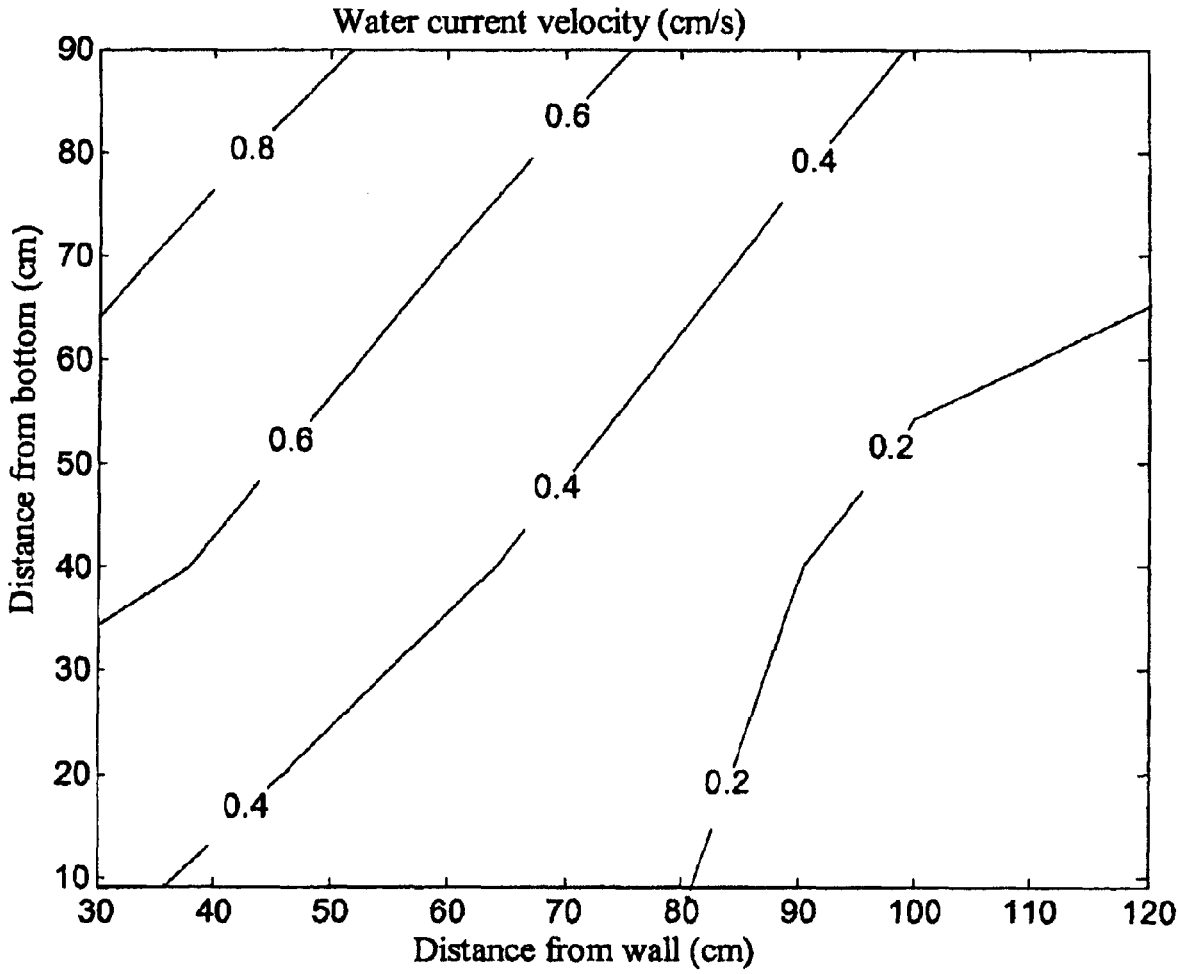
FIG. 4 is a graph plotting the water current velocity as a function of the distance the oysterbreaks were from the bottom and the wall surfaces of the tank in FIG. 3.

Flow, material, and height experiments of breakwaters (24, 26, and 28) placed in tank 20 were compared to prototype oysterbreak 2 to determine the effects predators had on settlement patterns. The highest current in tank 20, 1.5 cm/s, was measured at the top of the water column next to the wall, and the lowest current, 0 cm/s, was measured in the center of tank 20, as shown in FIG. 4. No significant difference ($F=0.79$ $p=0.6268$, and $F=1.06$ $p=0.4005$) of spat settlement was found between the coated PVC and the FRENCH TUBES™, respectively.

The materials (i.e., the plastic mesh, PVC pipe, mortar-coated PVC, and FRENCH TUBES™) used for evaluating the effectiveness of breakwaters (24, 26, and 28) had different effects on the abundance of oyster spat. The plastic mesh and the PVC pipe had no apparent oyster settlement effects. The mortar-coated PVC had a significantly different ($F=27.67$ $p<0.0001$) effect on oyster spat than the FRENCH TUBES™. The FRENCH TUBES™ had no significant differences with height and distance from the wall ($F=0.88$ $p=0.4696$ and $F=0.28$ $p=0.8417$, respectively). The mortar-coated PVC had no significant difference with height, but did have a significant difference with distance from the wall (F=2.01 p=0.1394 and F=3.94 p=0.0362, respectively), with an optimum difference at a distance of 60 cm from the wall. A very weak relationship was found to follow the curve identified by the equation $\alpha=(-)\ 0.0306\times\delta^2+3.6229\times\delta+109.56$, with $R^2=0.3649$, where "α" is abundance and "δ" is distance from the wall. No relationship existed between abundance and height, without the existence of predators.

The type of material (i.e., PVC pipe coated with FLEX-BOND™ mortar, schedule 40 PVC pipe, and FRENCH TUBES™, black plastic mesh) used to construct breakwaters (24, 26, and 28) impacted oyster settlement. The mortar-coated PVC was the most effective. Without wishing to be bound to this theory, it is believed that because oyster larvae are negatively-phototactic, the dark-colored mortar may have attracted the oyster larvae to breakwater 24. Black plastic mesh had no apparent oyster settlement effect. Another contributing factor to the oyster settlement may have been the arrangement of breakwaters (24, 26, and 28). Breakwater 26 constructed from FRENCH TUBES™ was placed in front of inlet 22. This made the environment around the FRENCH TUBES™ very turbulent, which may have made settlement for the oysters difficult. See S. E. Shumway, 1996.

Figure 5:
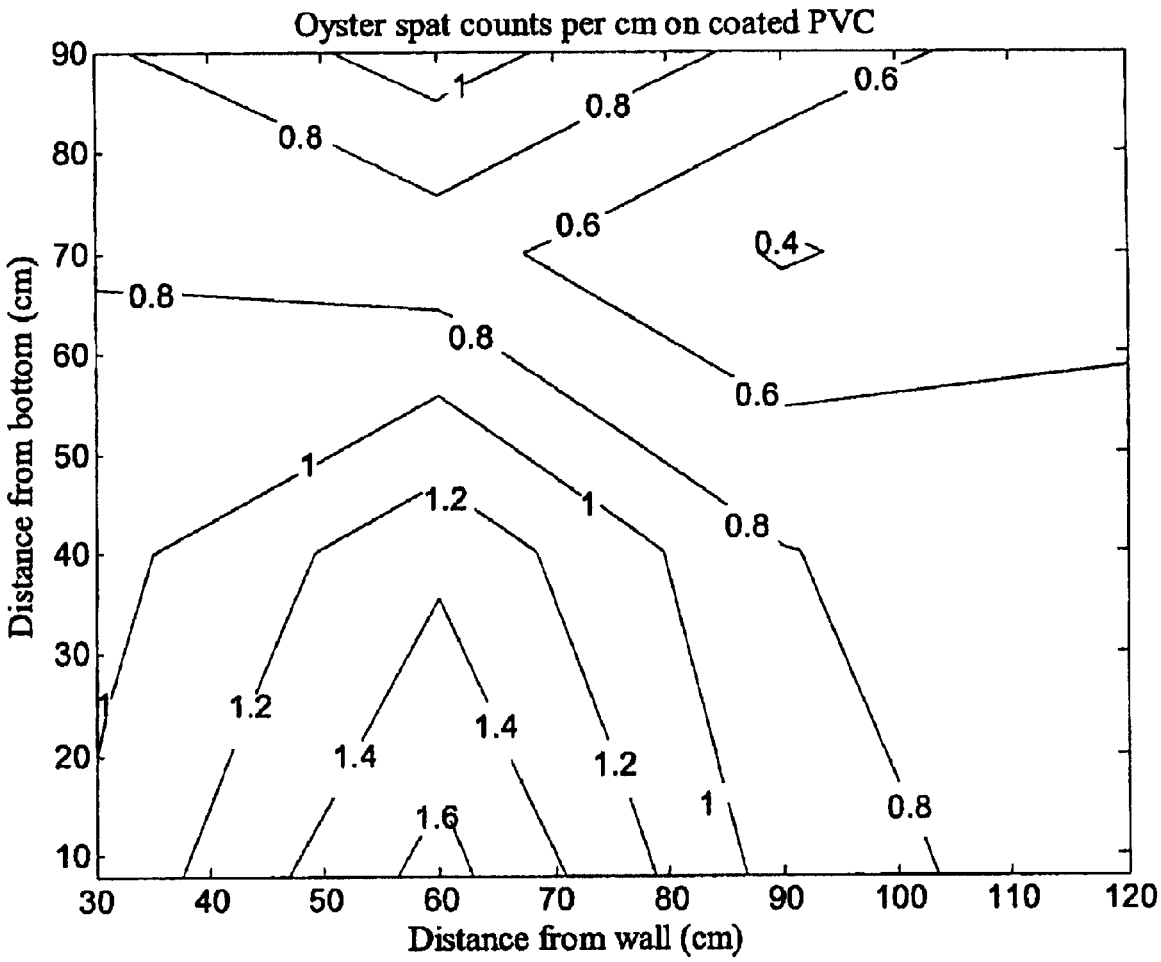
FIG. 5 is a graph plotting the oyster spat per centimeter found on coated PVC as a function as a function of the distance the oysterbreaks were from the bottom and the wall of the tank in FIG. 3.
Figure 6:
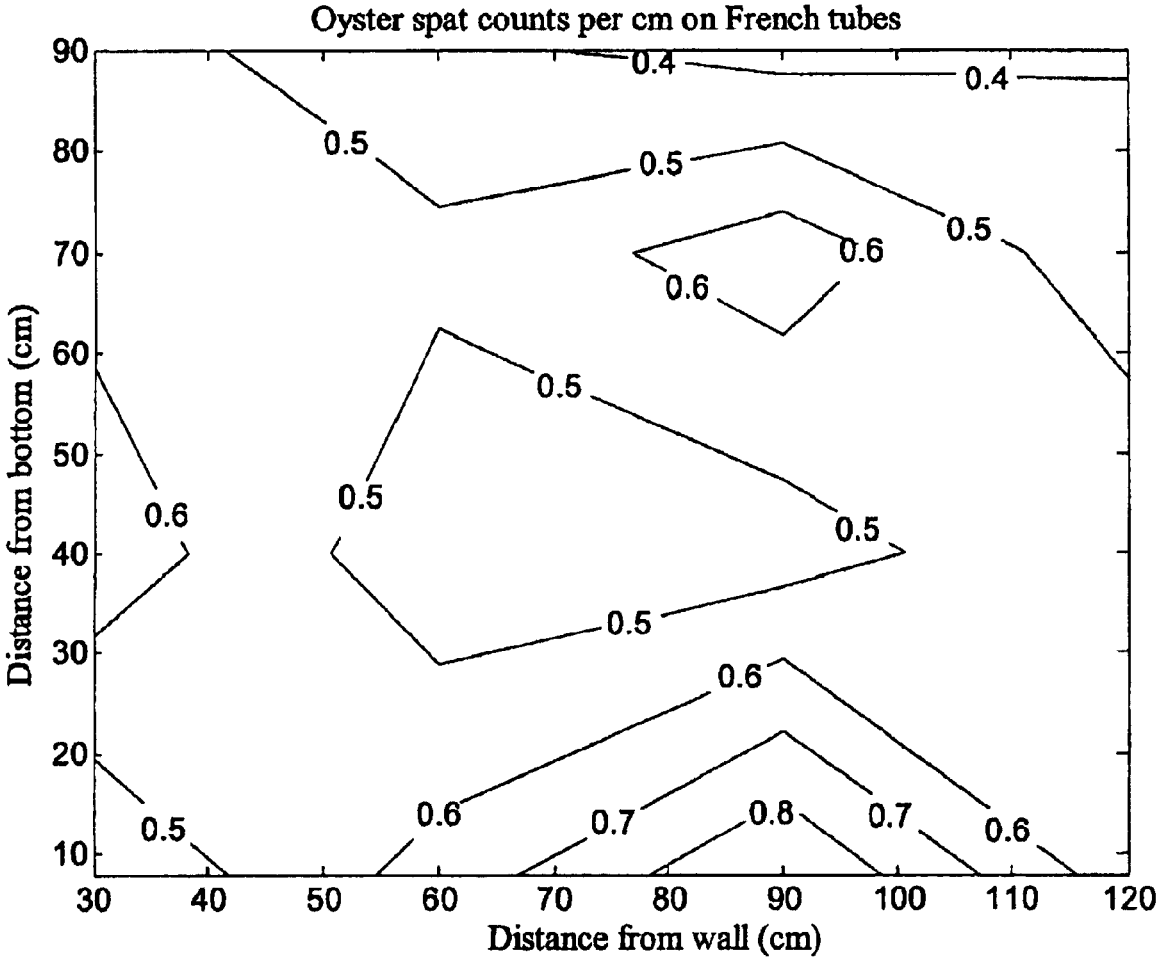
FIG. 6 is a graph plotting the oyster spat per centimeter found on French tubes™ as a function as a function of the distance the oysterbreaks were from the bottom and the wall of the tank in FIG. 3.

Without wishing to be bound by this theory, it is believed that oysters did not settle close to the wall because of the density of algae on the outside edge and bottom of tank 20 caused by the flow rotation inside tank 20. In the absence of predation, no apparent settlement pattern due to flow or height existed. See FIGS. 5 and 6.

EXAMPLE 5

Wave Tank Analysis of a Bioengineered Submerged Breakwater

Simulation of Environmental Conditions

Figure 7:
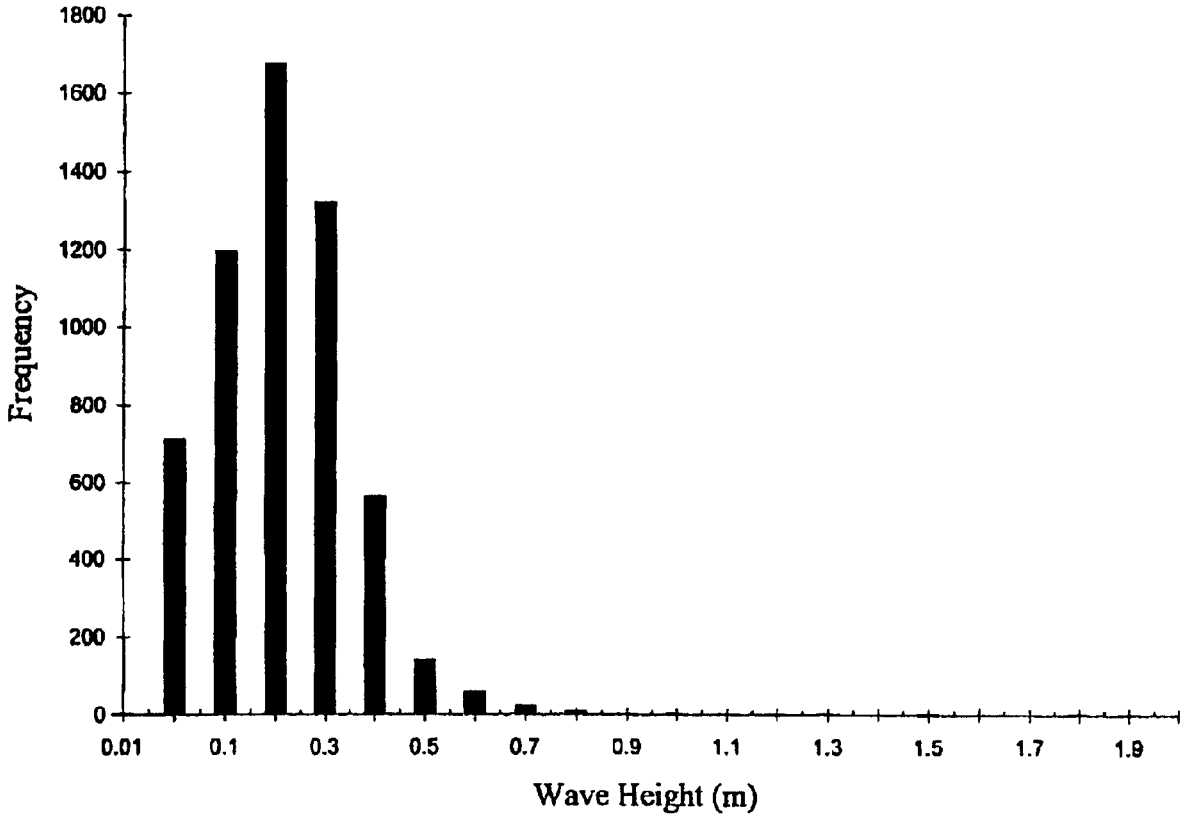
FIG. 7 is a graph plotting wave frequency as a function of wave height at WAVCIS station 11 in Terrebonne Bay, La. from Sep. 1, 2002 to Jun. 1, 2003.
Figure 8:
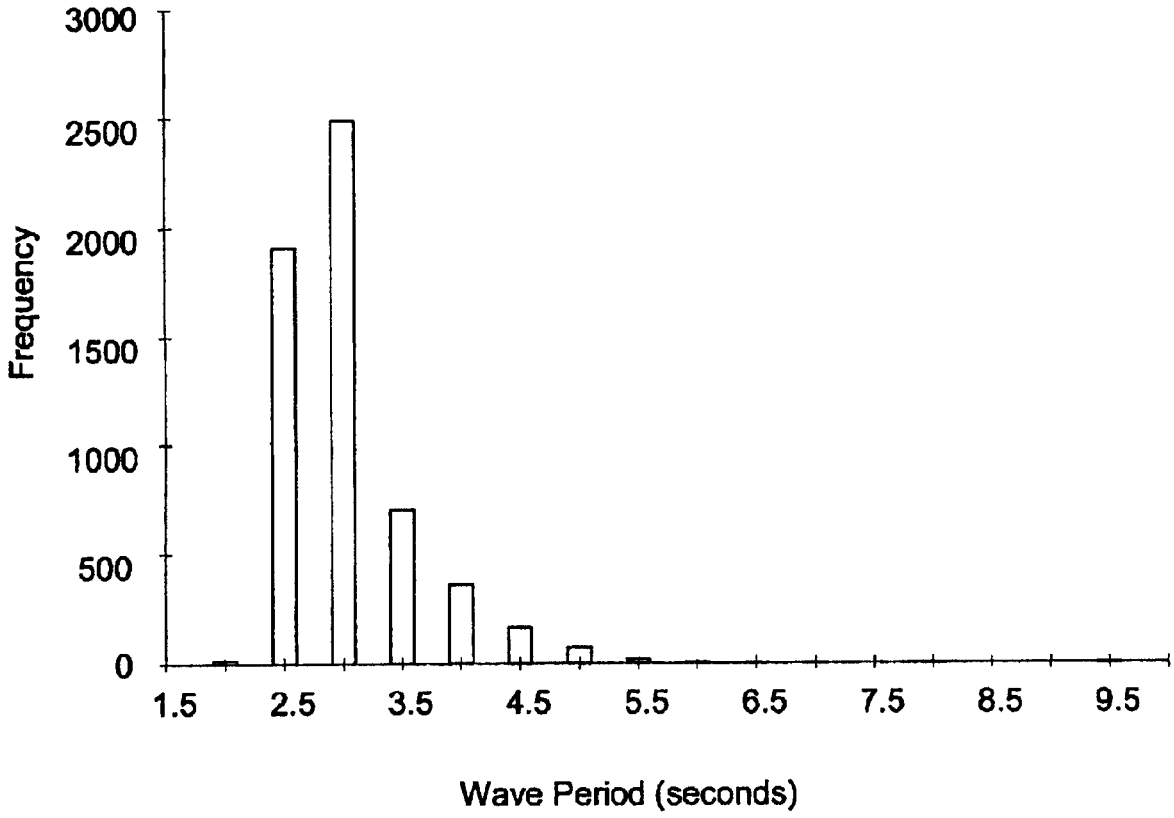
FIG. 8 is a graph plotting wave frequency as a function of wave period at WAVCIS station 11 in Terrebonne Bay, La. from Sep. 1, 2002 to Jun. 1, 2003.
Figures 9A, 9B, 9C, 9D:
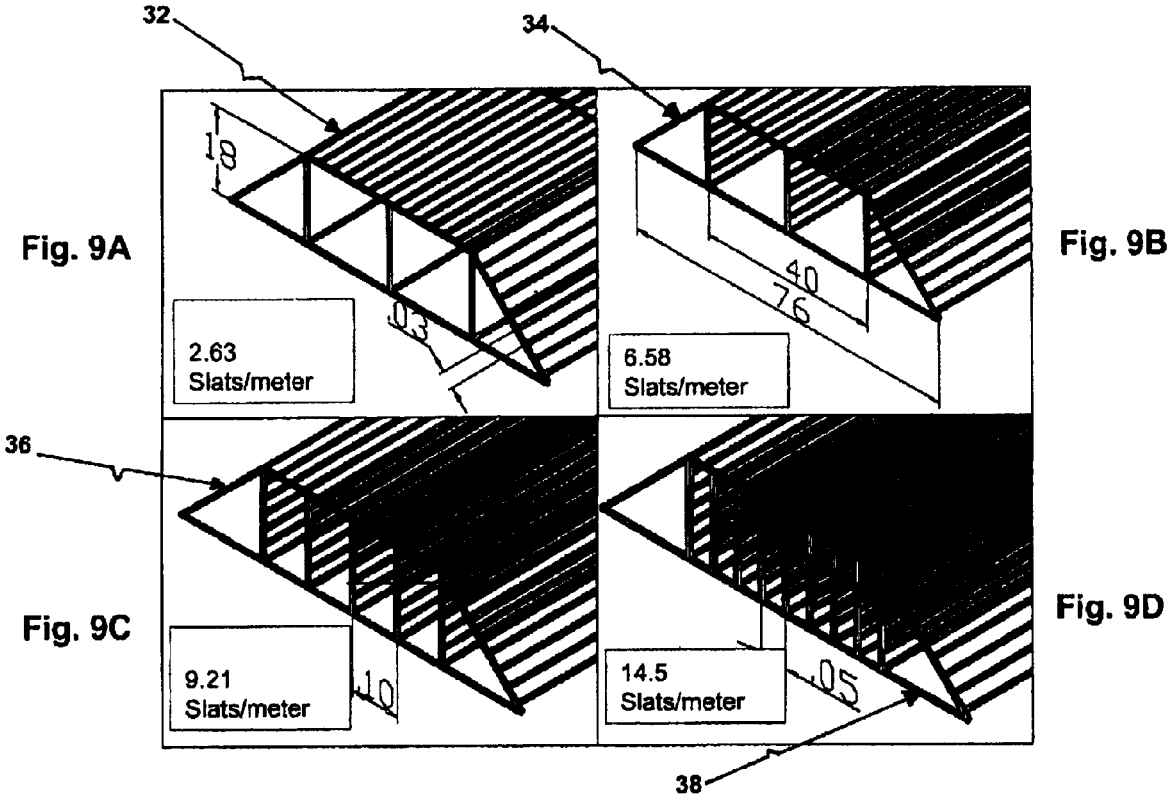
FIG. 9A is a perspective view of one embodiment of an oysterbreak used for wave tank experiments.
FIG. 9B is a perspective view of one embodiment of an oysterbreak used for wave tank experiments.
FIG. 9C is a perspective view of one embodiment of an oysterbreak used for wave tank experiments.
FIG. 9D is a perspective view of one embodiment of an oysterbreak used for wave tank experiments.

Physical model tests were conducted to determine the effects of oyster growth and density on the wave interaction characteristics of the oysterbreak. The environmental test conditions were modeled from environmental conditions present in Terrebonne Bay, La., which were acquired from the Coastal Studies Institute's WAVCIS station 11 (WAVCIS, 2004) at a depth of 1.22 m. Two wave designs were configured for the model tests by calculating the average coastal conditions in Terrebonne Bay. Data, using a nine-month time frame extending from September, 2002 to June, 2003, was acquired from WAVCIS archives. This data neglected some of the mid-summer wave conditions. The wave heights and wave periods from this data were plotted in frequency diagrams shown in FIGS. 7 and 8, respectively. The design waves were then selected from this frequency of occurrence. A wave height of 0.35 m (1.15 ft) and a wave period of 3.5 sec were selected for standard conditions, and a wave height of 0.54 m (1.77 ft) and a wave period of 5 sec were selected for higher conditions.

Dimensional Analysis

A physical model experiment was conducted based on a 1:4 length scale. Because the interaction of waves and oysterbreaks was considered, the Froude number was used in dimensional analysis. Oysterbreaks (24, 26, and 28) were in a highly turbulent environment, so the forces (e.g., hydrodynamic, viscous, and pressure forces) were dominated by inertia instead of skin friction. (The drag coefficient becomes independent of the Reynold's number when the Reynold's number exceeds 2,000.) In a turbulent environment, the general shape characteristics of the structure are more dominant than the roughness of the structure. In this environment, the Froude number would be more appropriate for dimensional analysis. See G. Murphy, Similitude in Engineering, Ch. 8, pp. 137–175 (New York, The Ronald Press Company, 1950); and T. Sarpkaya et al., Mechanics of Wave Forces on Offshore Structures Ch. 3, pp. 52–149 (New York, Van Nostrand Reinhold Company, 1981).

Using the Froude number to maintain similitude, the following relationship between the physical model and the prototype was established:

$$\frac{U_m}{\sqrt{g\times L_m}}=\frac{U_p}{\sqrt{g\times L_p}} \tag{3.1}$$

where "U" is the water particle orbital velocity, "g" is gravity, and "L" is the length describing the wave (i.e., wave height and wavelength). Subscripts "m" and "p" were used to distinguish the physical model and the prototype, respectively.

By solving Eq. 3.1 for $U_m$ using a 1:4 length scale, velocity can be represented as:

$$U_m=\frac{U_p}{2} \tag{3.2}$$

A wave generator was used to generate sinusoidal waves. However, trachoidal waves were formed by the wave generator because of the shallow environment found in the wave tank and the field conditions. Under these circumstances, the Second Order Wave Theory would typically be used to describe the horizontal component of water particle velocity for transitional waves, but because the waves generated by the wave generator were sinusoidal, the Linear Wave Theory is applicable in a 1:4 length scale. (If the Second Order Wave Theory was used the scaling equations would change.) Assuming the Linear Wave Theory is applicable for these conditions, the following equation is used to describe the horizontal component of water particle velocity for transitional waves:

$$U=\frac{HgT\mathrm{Cosh}[2\pi(z+d)/L]}{2L\mathrm{Cosh}[2\pi d/L]}\cos\theta \tag{3.3}$$

The horizontal velocity, U, of water particles in a water column accelerates and decelerates as a wave passes, where "z" is the particle position, "d" is the depth of the water column, "H" is the wave height, "T" is the period, and "L" is the length. See R. G. Dean et al., Water Wave Mechanics for Engineers and Scientists Ch. 3, pp. 41–73 (New Jersey, Prentice-Hall, Inc., 1984).

A 1:4 length scale was used for the terms in the hyperbolic cosine portion of Eq. 3.3, and then substituted into Eq. 3.2 for both the prototype and the model. The following relationship was formed:

$$\frac{H_mT_m}{L_m}=\frac{H_pT_p}{2L_p} \tag{3.4}$$

Because a 1:4 length scale was used to conduct a physical model experiment, the following relationships of wave length and wave height were acceptable:

$$L_m=L_p/4 \tag{3.5}$$

$$H_m=H_p/4 \tag{3.6}$$

When these equations are substituted into Eq. 3.4, the following relationship for wave period is established:

$$T_m = T_p/2 \quad (3.7)$$

By using these relationships, suitable design waves were determined for the physical model experiments.

Building the Physical Models

To determine whether the density of an oysterbreak effects wave dissipation, comparison tests using various sizes of oysterbreaks were performed. FIGS. 9A–9D illustrate perspective views of several embodiments of tube-based oysterbreaks (32, 34, 36, and 38, respectively) were constructed from four types of iron rebar structures using a 1:4 length scale, in accordance with this invention. Oysterbreaks (32, 34, 36, and 38) had an extruded trapezoidal shape, with a top crest width of 40 cm and a base crest width of 76 cm. Each oysterbreak (32, 34, 36, and 38) had the same general dimensions, but a different number of vertical sections (or slats) having 3 cm spaced horizontal bars. The horizontal bars were welded to an A-frame having 3 cm spacings between the centers of the bars. The sides of the oysterbreaks (32, 34, 36, and 38) had a slope of 45° with a height of 18 cm and a length of 122 cm. The oysterbreaks (32, 34, 36, and 38) had the following slats per meter (slats/m) configuration, as shown in FIGS. 3A–3D, respectively: 2.63 slats/m; 6.58 slats/m; 9.21 slats/m; and 14.5 slats/m. (The ratio of slats/m was determined by calculating the sum of all slats, vertical and slanted, and dividing that number by the width of the oysterbreak.) For comparison purposes, a rock breakwater having a mean rubble diameter of approximately 10 cm, and a size and shape similar to the rebar structures was constructed.

Simulation of Growth

Growth effects were examined by simulating three growth stages using the four types of iron rebar structures. Each of the four structures was dipped into a mixture of Type II Portland cement and organic additives, including cottonseed and garden mulch, until a desired thickness was achieved. These organic additives created a texture similar to that of an oysterbreak with oysters attached thereto. The growth stages were zero growth (initial stage), intermediate growth stage, and mature growth stage, and each stage had average radii of 0.005 m, 0.008 m, and 0.012 m, respectively. Twelve oysterbreak structures 52 (structures comprising 2.63 slats/m, 6.58 slats/m, 9.21 slats/m and 14.47 slats/m with three different growth stages—initial, intermediate and final growth stages) were constructed for experimentation.

Wave Tank Setup and Procedure

Figure 10:
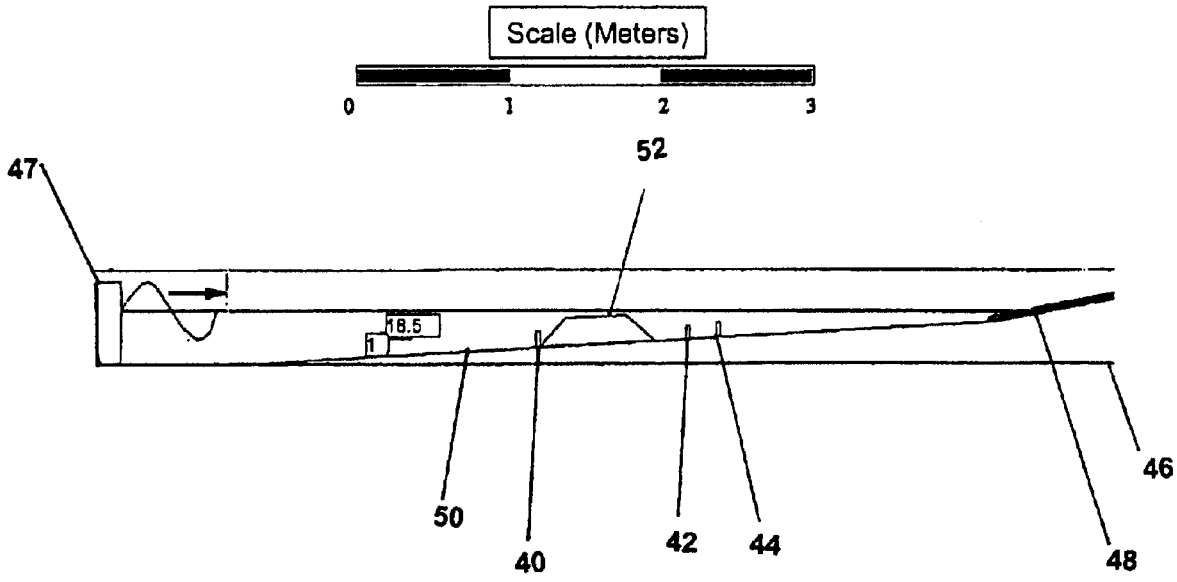
FIG. 10 is a schematic view of the experimental setup of the wave tank used for studying the oysterbreaks in FIGS. 9A–9B.
Figure 11:
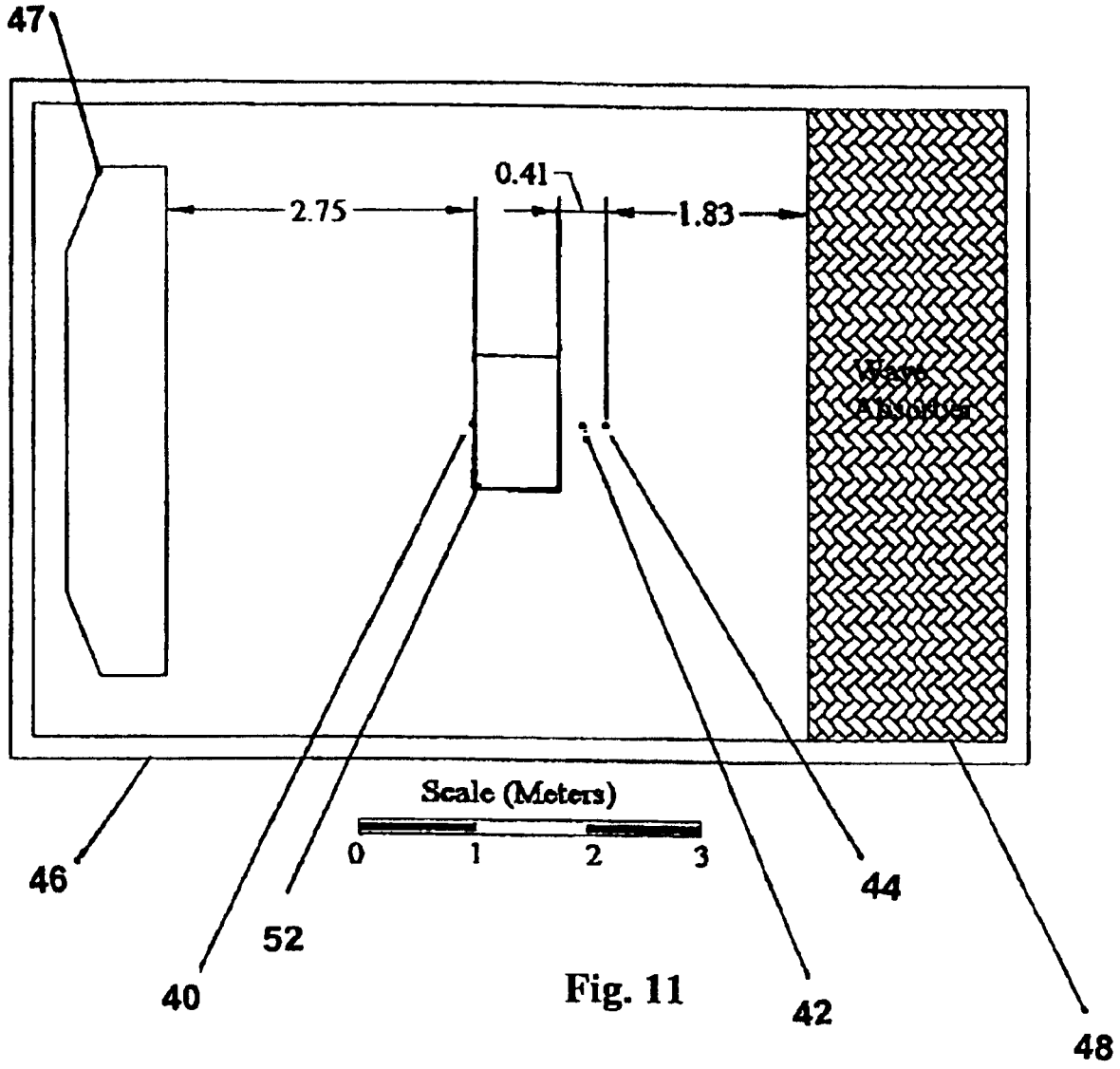
FIG. 11 is top view of the experimental setup of the wave tank shown in FIG. 10.

DRUCK® pressure sensors (40, 42, and 44) having a range of 5 psig (model PDCR 1830; Druck, Inc., New Fairfield, Conn.) were used to measure waves, as shown in FIGS. 10 and 11. Pressure sensors (40, 42, and 44) were connected to a 23× Campbell Scientific micrologger (Campbell Scientific Inc., Logan, Utah) that recorded data at a frequency of 33 Hz. Pressure sensors (40, 42, and 44) were placed directly in front of and behind the oysterbreaks, and rigidly attached to an aluminum flat bar to ensure consistency in placement and spacing. As waves passed over pressure sensors (40, 42, and 44), data were viewed on a computer screen in real time. Following each test, data from the micrologger was downloaded and saved.

Two types of scaled-design waves were generated in wave tank 46, using a MTS Portable Piston Wave generator system 47 (MTS Systems Corporation, Eden Prairie, Minn.) having a wave generator assembly, a motor controller, and an MTS 407 Controller. The first type of wave had an average height of between about 0.078 m and about 0.096 m and a wave period of between about 1.875 sec and about 1.905 sec. The second type of wave had an average height of between about 0.126 m and about 0.144 m, and a wave period of between about 2.345 sec and about 2.355 sec.

To reduce the occurrence of pressure sensor interference caused by wave reflection and backwash, wave absorbers 48 (i.e., fibrous mats) fabricated from coconut husks were placed at the end of tank 46 on a surface adapted to imitate a beach slope. The average slope of the bottom surface 50 of tank 46 was approximately 0.054. See FIG. 10. Surveys of the slope were conducted before and after each experiment. To determine the mean slope of tank 46, the average of seven transects were taken perpendicular to the wave board and 0.61 m apart. The slope was planed (i.e., graded and flattened to make it more homogeneous) before the beginning of each repetition to minimize any interference effects it may have on waveforms. Analysis of variance statistics, using SAS© software (SAS Institute Inc., Cary, N.C.), were run on the mean slopes to confirm that the slopes were similar.

The following procedure was used for each repetition. Before each repetition, the slope of tank 46 was surveyed to determine if any changes occurred during the tests, and then tank 46 was filled to a mean water level of 0.35 m. Pressure sensors 40, 42, and 44) in tank 46 were then checked for calibration errors. Next, one of the twelve oysterbreak structures 52 was placed in tank 46 and subjected to the two scaled-design waves for approximately 1 min. Afterwards, structure 52 was removed and a control was achieved by subjecting tank 46 to the scaled-design waves. This process was repeated for each of the twelve structures 52 and the rock breakwater. After all of the structures 52 were tested, tank 46 was drained. Next, a survey was conducted to determine the slope of tank 46 at the end of the experiments. The slope was then planed again to a uniform state. Wave heights were then calculated by taking the average wave height (maximum peak to minimum trough) for the duration of each test. The transmission coefficients, $K_t$, were determined by the ratio of the transmitted wave height behind structure 52 (at pressure sensor 44) to the wave height at the same position without structure 52. The reflection coefficients, $K_r$, were determined by the ratio of the reflected wave height in front of structure 52 (at pressure sensor 40) to the wave height at the same position without structure 52 to determine the amount of reflection the presence of structure 52 caused. Ahrens, J. P., 1987. "Characteristics of Reef Breakwaters." Technical Report CERC-87-17, Coastal Engineering Research Center, U.S. Army Corps of Engineers Waterways Experiment Station, Vicksburg, Miss., 62.

Using the equation provided by J. P. Ahrens, "Characteristics of reef breakwaters," Technical Report CERC-87-17, Coastal Engineering Research Center, U.S. Army Corps of Engineers Waterways Experimental Station, Vicksburg, Miss., 1987, the dissipation coefficients, $K_d$, were calculated as $$K_t^{2+2+K_r^2} + K_d^2 = 1.0 \quad (8)$$

The Effects of the Oysterbreaks on Wave Breaking

The scaled-design waves had breaking characteristics that were affected by the introduction of all twelve oysterbreak structures 52. Surface elevation of the water as a function of time was estimated using pressure sensors (40, 42, and 44) for each oysterbreak structure 52. See FIGS. 10 and 11. Type 1 waves behaved like low crested sinusoidal waves having an average wave height of between 0.078 m and 0.096 m and a wave period of between 1.74 sec and 2.04 sec.

Figures 12, 12A, 12B, 12C:
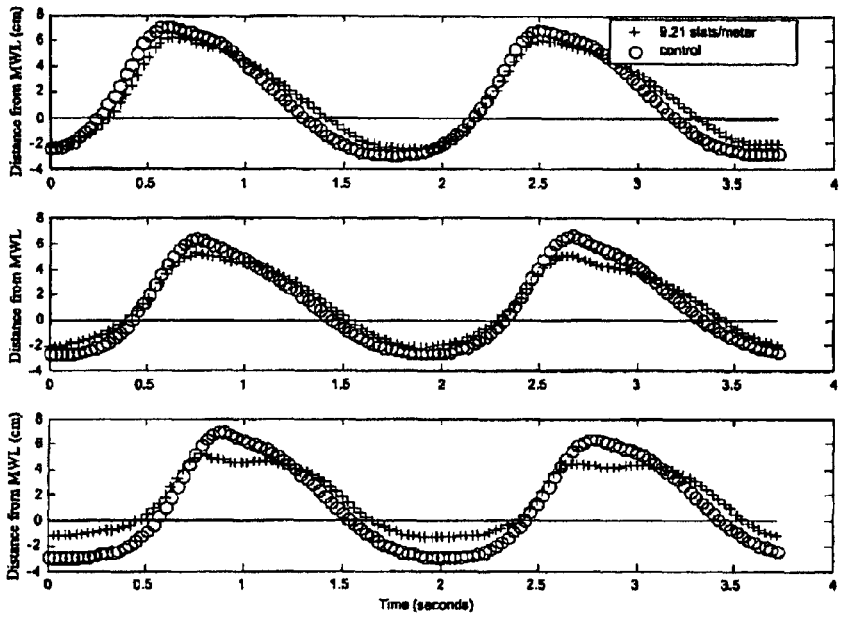
FIG. 12A is a graph plotting the water level change as a function of time and distance from the mean water level for type 1 waves at initial growth, with and without the oysterbreak structures in place.
FIG. 12B is a graph plotting the water level change as a function of time and distance from the mean water level for type 1 waves at intermediate growth, with and without the oysterbreak structures in place.
FIG. 12C is a graph plotting the water level change as a function of time and distance from the mean water level for type 1 waves at final growth, with and without the oysterbreak structures in place.

FIGS. 12A–12C are graphs illustrating how type 1 waves interacted with the oysterbreaks. The waves interacting with the zero growth stage, as shown in FIG. 12A, were impacted minimally. The wave height was slightly lowered at the wave peak (i.e., crest of the wave). Waves interacting with the intermediate growth stage, as shown in FIG. 12B, were transformed into spilling breakers over oysterbreak structures 52. The final growth stage produced waves that were also breaking over oysterbreak structures 52 as shown in FIG. 12C. Without the presence of oysterbreak structures 52, type 1 waves were breaking on the wave absorbing material with considerable force (i.e., enough force to cause erosion).

Figures 13, 13A, 13B, 13C:
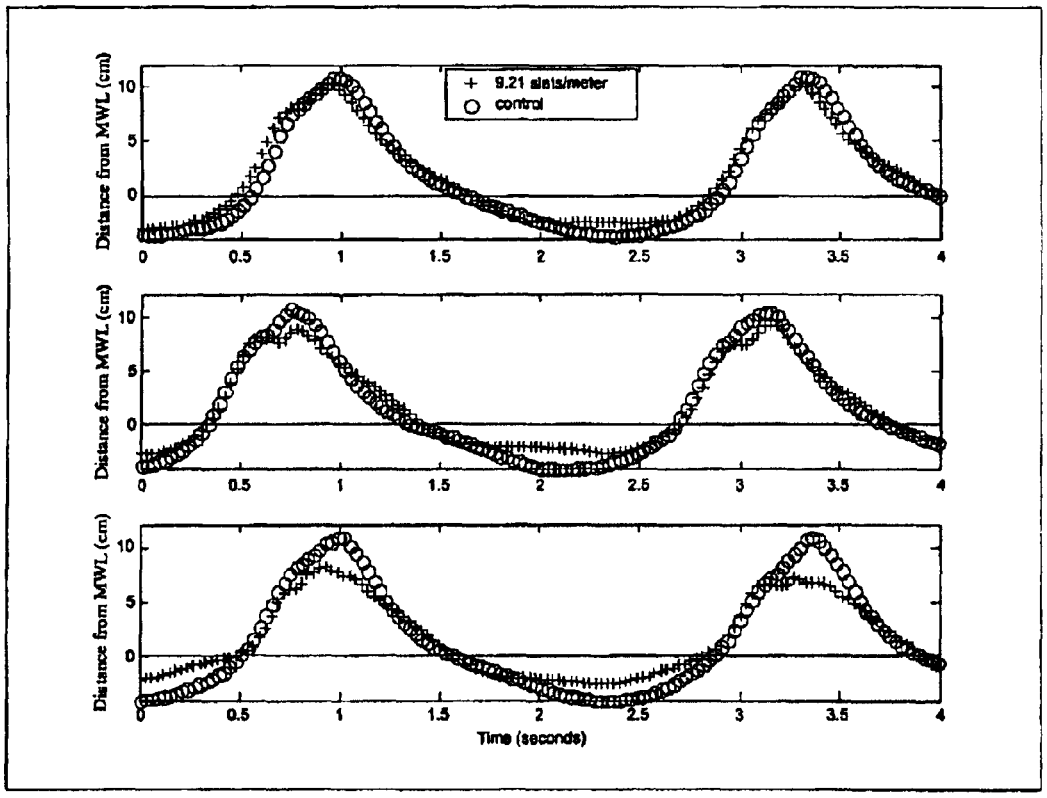
FIG. 13A is a graph plotting the water level change as a function of time and distance the mean water level for type 2 waves at initial growth, with and without the oysterbreak structures in place.
FIG. 13B is a graph plotting the water level change as a function of time and distance from the mean water level for type 2 waves at intermediate growth, with and without the oysterbreak structures in place.
FIG. 13C is a graph plotting the water level change as a function of time and distance from the mean water level for type 2 waves at final growth, with and without the oysterbreak structures in place.

FIGS. 13A–13C are graphs illustrating how type 2 waves interacted with oysterbreak structures 52. The type 2 waves behaved like steep trachoidal waves having an average wave height of between 0.126 m and 0.144 m and a wave period of between 2.30 sec and 2.40 sec. After oysterbreak structures 52 were removed, the type 2 waves behaved like breaker waves. As shown in FIG. 13A, the initial growth stage forced the wave to break earlier and lessened the plunging breakers energy. The introduction of the intermediate growth stage, as shown in FIG. 13B, caused the waves to break directly on top of oysterbreak structures 52. The final growth stage, as shown in FIG. 13C, produced a surging breaker that dissipated almost all the wave energy as it approached the shore. Table 1 shows the distance type 2 waves were braking from the wave generator with and without the introduction of oysterbreak structures 52.

TABLE 1

| Radial Growth (m) | Oysterbreaks (slats/m) | Breaking distance from Wave Generator (meters) With Oysterbreaks | Without Oysterbreaks | Change in wave breaking position (m) | Distance of breaking from center of Oysterbreak (m) |
|---|---|---|---|---|---|
| 0.005 | 2.63 | 3.87 | 3.99 | −0.12 | 1.13 |
| 0.005 | 6.58 | 3.51 | 4.02 | −0.52 | 0.76 |
| 0.005 | 9.21 | 3.75 | 3.96 | −0.21 | 1.01 |
| 0.005 | 14.47 | 3.69 | 4.05 | −0.37 | 0.94 |
| 0.008 | 2.63 | 3.37 | 3.90 | −0.53 | 0.63 |
| 0.008 | 6.58 | 3.57 | 4.05 | −0.49 | 0.82 |
| 0.008 | 9.21 | 3.23 | 4.05 | −0.82 | 0.49 |
| 0.008 | 14.47 | 3.14 | 4.02 | −0.88 | 0.40 |
| 0.012 | 2.63 | 2.83 | 3.99 | −1.16 | 0.09 |
| 0.012 | 6.58 | 2.80 | 4.02 | −1.22 | 0.06 |
| 0.012 | 9.21 | 2.74 | 3.93 | −1.19 | 0.00 |
| 0.012 | 14.47 | 2.77 | 3.90 | −1.13 | 0.03 |

Wave Transmission

Figure 14:
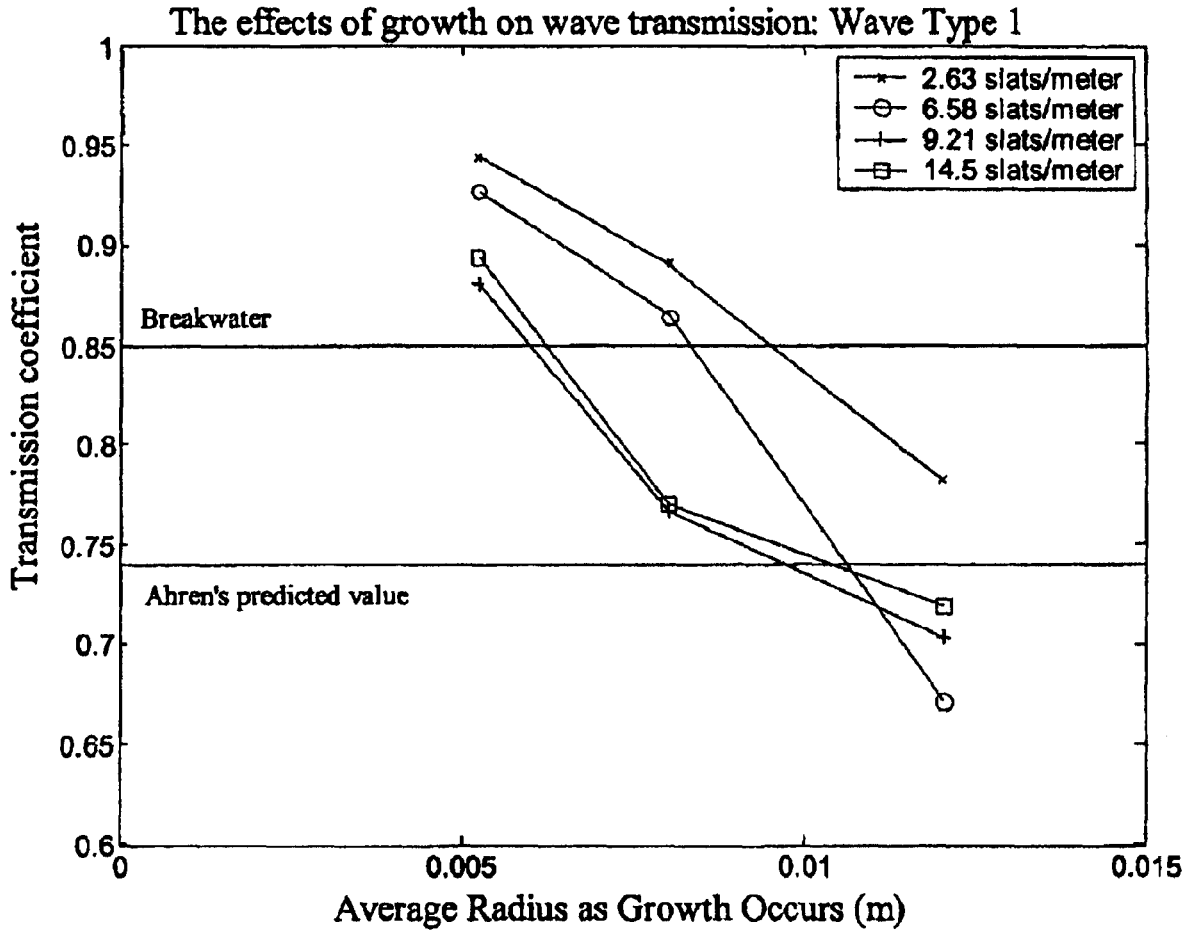
FIG. 14 is a graph plotting the wave transmission coefficient of four different oysterbreak structures as a function of radius (i.e., the distance oysters grow from the center of each growth layer) as growth occurs for each of the structures under wave type 1 conditions.

FIG. 14 is a graph depicting the transmission coefficients as growth occurs for each of oysterbreak structures 52 under wave condition 1 (define wave condition 1). Oysterbreak values were compared with the physical breakwater and predicted values. Wave transmission decreased as simulated growth occurred on the twelve oysterbreak structures 52. The initial growth stages of the oysterbreak structures 52 were slightly less effective at reducing wave transmission than the constructed breakwater of the same size. At the intermediate growth stage, the denser oysterbreak structures 52 were more effective and approached Ahrens' predicted value of 0.74 for a rock breakwater of comparable size with a mean stone diameter size of 2 cm. At the intermediate growth stage, the 2.63 slats/m and the 6.58 slats/m oysterbreak structures 52 were not significantly different (p=0.8462, df=6).

The 9.21 slats/m and the 14.5 slats/m oysterbreak structures 52 were also not significantly different (p=0.8109, df=6). In the final growth stage, all versions of oysterbreak structures 52 were between 0.67 and 0.78, which is in the range of Ahrens' predicted value, 0.74, as shown in Table 2. The 2.63 and 14.5 slats/m oysterbreak structures 52 were not significantly different (p=0.1805, df=6). The 6.58 and 9.21 slats/m oysterbreak structures 52 were not significantly different (p=0.7080, df=6), nor were the 9.21 and 14.5 slats/m oysterbreak structures 52 significantly different (p=0.9279, df=6).

TABLE 2

| Wave Type 1 | | |
|---|---|---|
| Radial Growth (m) | Slats/m | Transmission Coefficient |
| 0.005 | 2.63 | 0.944 ± 0.049 |
| 0.005 | 6.58 | 0.927 ± 0.040 |
| 0.005 | 9.21 | 0.881 ± 0.053 |
| 0.005 | 14.47 | 0.894 ± 0.052 |
| 0.008 | 2.63 | 0.891 ± 0.068 |
| 0.008 | 6.58 | 0.865 ± 0.052 |
| 0.008 | 9.21 | 0.766 ± 0.068 |
| 0.008 | 14.47 | 0.771 ± 0.064 |
| 0.012 | 2.63 | 0.783 ± 0.028 |
| 0.012 | 6.58 | 0.671 ± 0.075 |
| 0.012 | 9.21 | 0.704 ± 0.060 |
| 0.012 | 14.47 | 0.719 ± 0.063 |

TABLE 2-continued

| Wave Type 1 | | |
|---|---|---|
| Radial Growth (m) | Slats/m | Transmission Coefficient |
| Physical Rock Breakwater | | 0.847 ± 0.108 |
| Ahren's predicted value for a breakwater with 2.0 cm mean stone diameter | | 0.740 ± 0.027 |

Figure 15:
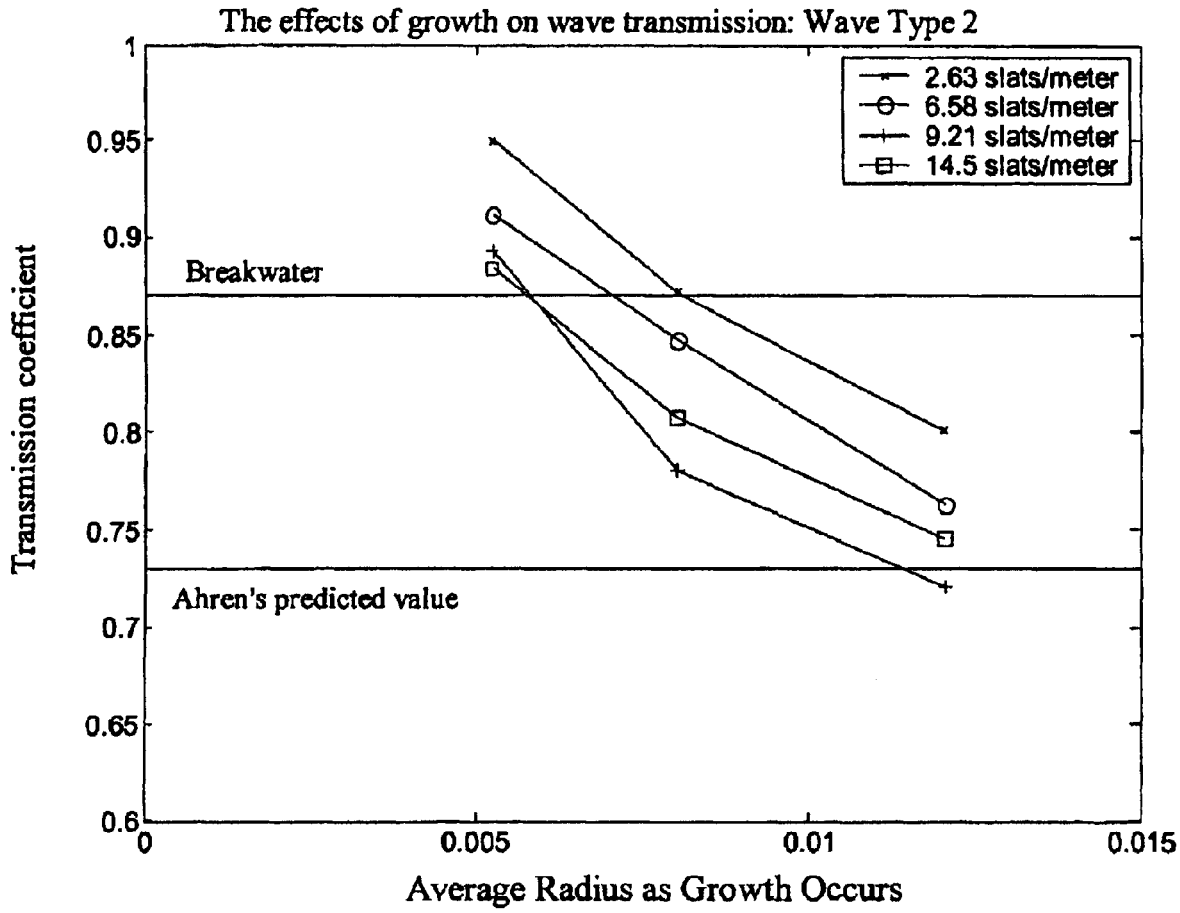
FIG. 15 is a graph plotting the wave transmission coefficient of four different oysterbreak structures as a function of radius as growth occurs for each of the structures under wave type 2 conditions.

FIG. 15 is a graph depicting the transmission coefficients as growth occurs for each of the structures under wave type 2. The oysterbreak values were compared to the physical breakwater and predicted values. The values of transmission for the type 2 waves were less differentiated between the structures, when compared to type 1 waves. The values of transmission (especially at the 0.008 radial growth stage) were separated by a larger margin in type 1 wave conditions. The transmission coefficients of each oysterbreak structure 52 were reduced proportional to the radial growth. The most effective oysterbreak structure 52 was the 9.21 slats/m design. The least effective oysterbreak structure 52 was the 2.63 slats/m design, which was the most porous structural design. In the initial growth stage, the oysterbreak structures performed similarly. The 9.21 slats/m and the 14.5 slats/m oysterbreak structures 52 were not significantly different (p=0.7125, df=6). In the intermediate growth stage, the structures performed similar to the physical rock breakwater, which had a transmission coefficient of 0.87. The 9.21 slats/m and the 14.5 slats/m oysterbreak structures 52 were not significantly different in the intermediate growth stage (p=0.1325, df=6). In the final growth stage, all oysterbreak structures 52 achieved transmission coefficients as low as the predicted value of 0.73 for a rock breakwater as provided in Table 3, except the 2.63 slats/m oysterbreak structure 52, which achieved a transmission coefficient of 0.80. The 9.21 slats/m and the 14.5 slats/m oysterbreak structures 52 were significantly different (p=0.0007, df=6). The 9.21 slats/m oysterbreak structure 52 had the lowest transmission coefficient value of 0.72.

TABLE 3

| Wave Type 2 | | |
|---|---|---|
| Radial Growth (m) | Slats/meter | Transmission Coefficient |
| 0.005 | 2.63 | 0.950 ± 0.015 |
| 0.005 | 6.58 | 0.912 ± 0.026 |
| 0.005 | 9.21 | 0.892 ± 0.035 |
| 0.005 | 14.47 | 0.884 ± 0.043 |
| 0.008 | 2.63 | 0.872 ± 0.027 |
| 0.008 | 6.58 | 0.848 ± 0.026 |
| 0.008 | 9.21 | 0.781 ± 0.048 |
| 0.008 | 14.47 | 0.808 ± 0.053 |
| 0.012 | 2.63 | 0.801 ± 0.043 |
| 0.012 | 6.58 | 0.763 ± 0.047 |
| 0.012 | 9.21 | 0.721 ± 0.061 |
| 0.012 | 14.47 | 0.746 ± 0.045 |
| Physical Rock Breakwater | | 0.871 ± 0.050 |
| Ahren's predicted value for a breakwater with 2.0 cm mean stone diameter | | 0.731 ± 0.023 |

Wave Reflection

Tests were also conducted to determine how wave reflection affected the prototype tube-based oysterbreak. Wave reflection is an important component of the traditional breakwater design because as reflection increases the occurrence of scouring (i.e., the undermining of rocks that form traditional rubble mound breakwaters) increases.

Figure 16:
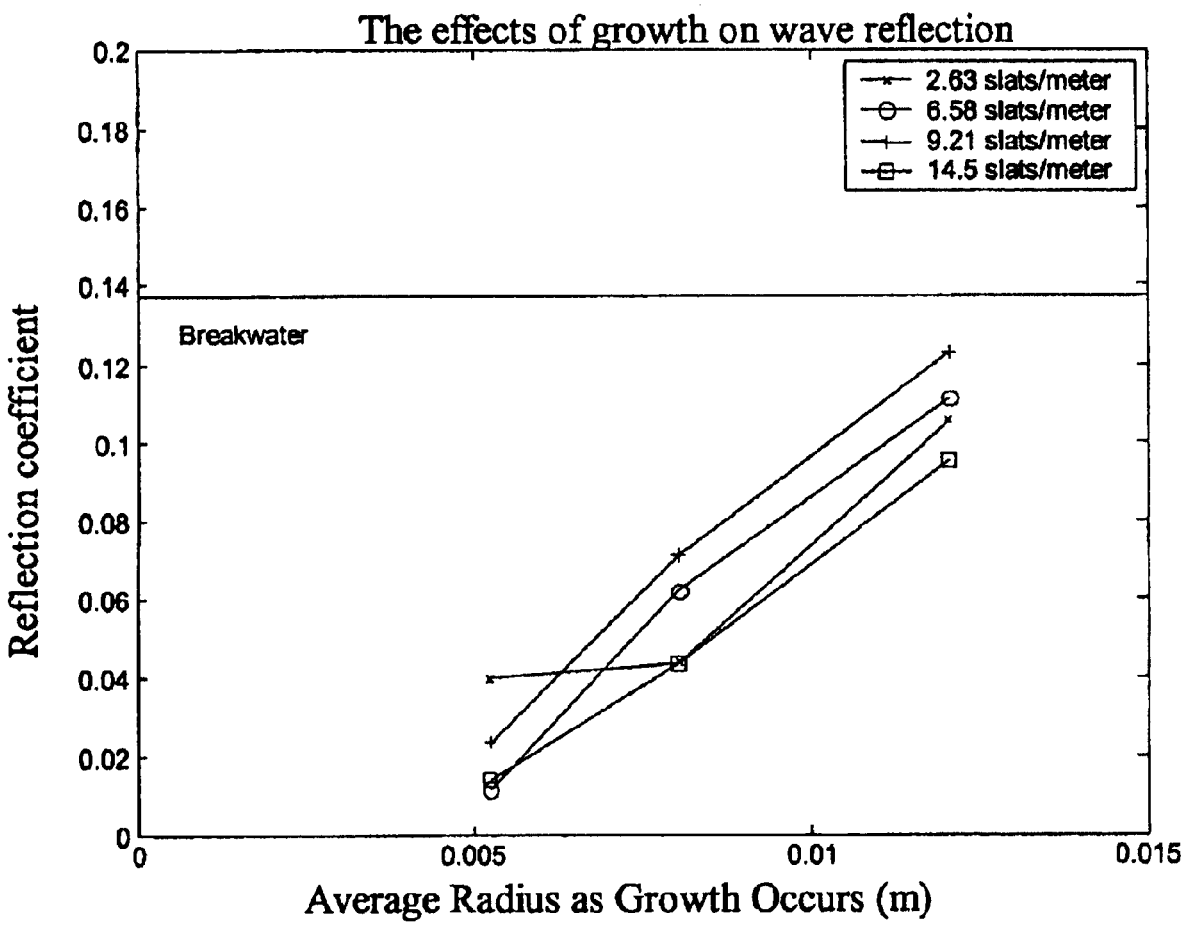
FIG. 16 is a graph plotting the reflection coefficients of four different oysterbreak structures as a function of radius as growth occurs for each of the structures under wave type 1 conditions.

FIG. 16 is a graph depicting the reflection coefficients as growth occurs for each of the structures under wave type 1. Oysterbreak values were compared to the physical breakwater values. There was a general increase in the reflection coefficient as growth occurred. The reflection coefficients of the oysterbreak structures 52 (i.e., the 2.63 slats/m, 6.58 slats/m, 9.21 slats/m, and 14.5 slats/m structures) were less than the physical breakwater value of 0.137 in the final growth stage. In the intermediate growth stage, the reflection coefficients of the 6.58 slats/m and 9.21 slats/m oysterbreak structures 52 were not significantly different (p=0.8126, df=6). The reflection coefficients of 2.63 slats/m and 14.5 slats/m oysterbreak structures 52 were also not significantly different (p=0.8732, df=6). In the final growth stage, the highest reflection coefficient value of 0.123 was achieved with the 9.21 slats/m structure, and the lowest value of 0.095 was achieved with the 14.5 slats/m oysterbreak structures 52. Table 4 shows the average and standard deviation of the reflection coefficient for each of the structures tested under wave type 1.

TABLE 4

| Wave Type 1 | | |
|---|---|---|
| Radial Growth (m) | Slats/meter | Reflection Coefficient |
| 0.005 | 2.63 | 0.040 ± 0.045 |
| 0.005 | 6.58 | 0.012 ± 0.022 |
| 0.005 | 9.21 | 0.023 ± 0.052 |
| 0.005 | 14.47 | 0.014 ± 0.036 |
| 0.008 | 2.63 | 0.044 ± 0.052 |
| 0.008 | 6.58 | 0.062 ± 0.068 |
| 0.008 | 9.21 | 0.071 ± 0.057 |
| 0.008 | 14.47 | 0.043 ± 0.022 |
| 0.012 | 2.63 | 0.105 ± 0.046 |
| 0.012 | 6.58 | 0.111 ± 0.062 |
| 0.012 | 9.21 | 0.123 ± 0.077 |
| 0.012 | 14.47 | 0.095 ± 0.058 |
| Physical Rock Breakwater | | 0.137 ± 0.060 |

Figure 17:
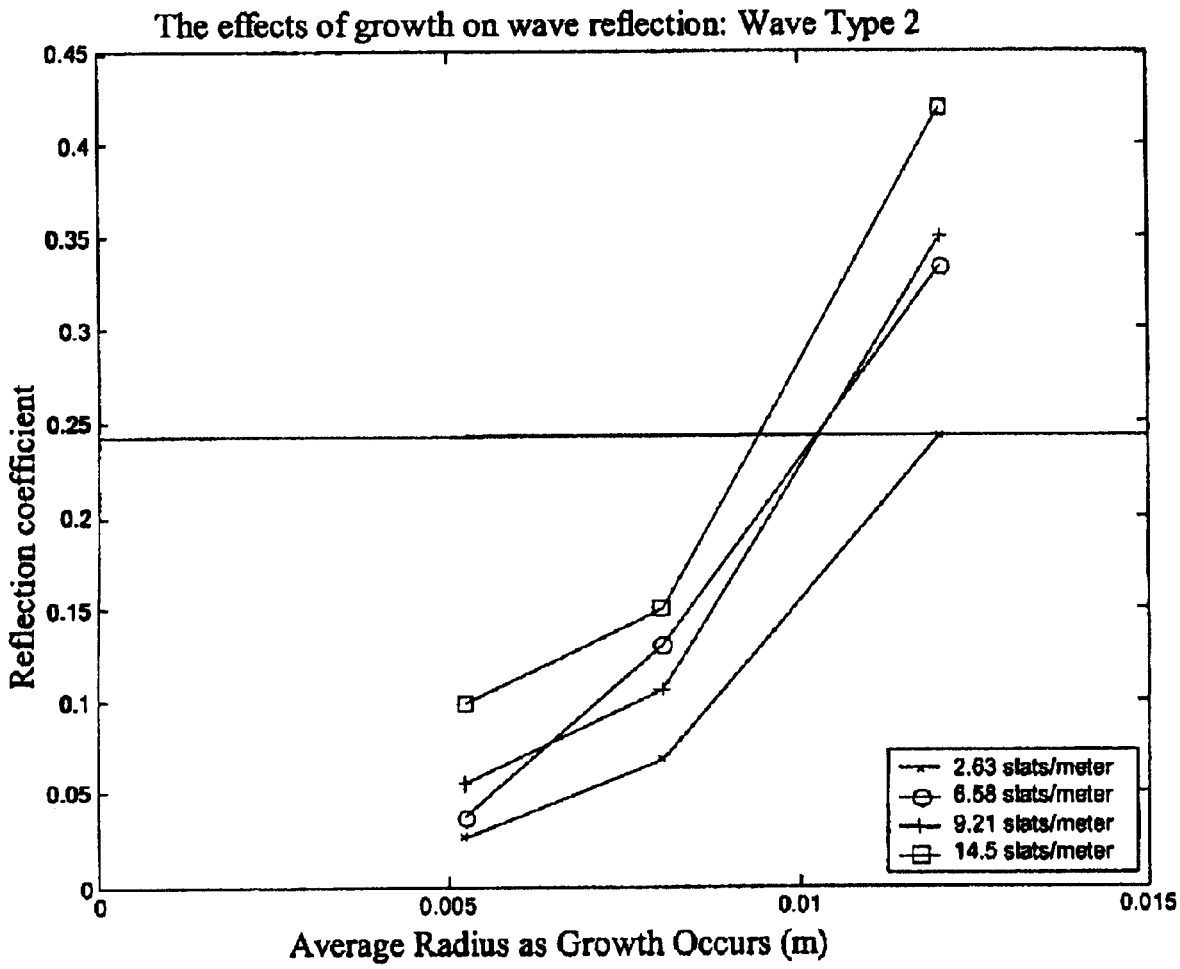
FIG. 17 is a graph plotting the reflection coefficients of four different oysterbreak structures as a function of radius as growth occurs for each of the structures under wave type 2 conditions.

FIG. 17 is a graph depicting the reflection coefficients as growth occurs for each of oysterbreak structures 52 under wave type 2. Oysterbreak values were compared to the physical breakwater values. In wave type 2, the trends for reflection coefficients were much different. At the final growth stage, the structure producing the highest reflection was 14.5 slats/m, at a value of 0.420, followed by 9.21 slats/m and 6.58 slats/m, at values of 0.350 and 0.334, respectively. The lowest value was the 2.63 slats/m oysterbreak structure 52 at a value of 0.243. The 6.58 slats/m and 9.21 slats/m oysterbreak structures 52 performed similarly at all growth stages. The initial growth stage produced the lowest reflection values for all configurations. All of the oysterbreak structures 52 achieved values below 0.099. Table 5 shows the average and standard deviation of the reflection coefficient for each of oysterbreak structures 52 tested under wave type 2.

TABLE 5

| Wave Type 2 | | |
|---|---|---|
| Radial Growth (m) | Slats/meter | Reflection Coefficient |
| 0.005 | 2.63 | 0.026 ± 0.030 |
| 0.005 | 6.58 | 0.037 ± 0.017 |
| 0.005 | 9.21 | 0.055 ± 0.026 |
| 0.005 | 14.47 | 0.099 ± 0.096 |
| 0.008 | 2.63 | 0.069 ± 0.023 |
| 0.008 | 6.58 | 0.131 ± 0.039 |
| 0.008 | 9.21 | 0.105 ± 0.132 |
| 0.008 | 14.47 | 0.150 ± 0.038 |
| 0.012 | 2.63 | 0.243 ± 0.085 |
| 0.012 | 6.58 | 0.334 ± 0.089 |
| 0.012 | 9.21 | 0.350 ± 0.170 |
| 0.012 | 14.47 | 0.420 ± 0.071 |
| Physical Rock Breakwater | | 0.243 ± 0.103 |

Wave Dissipation

Figure 18:
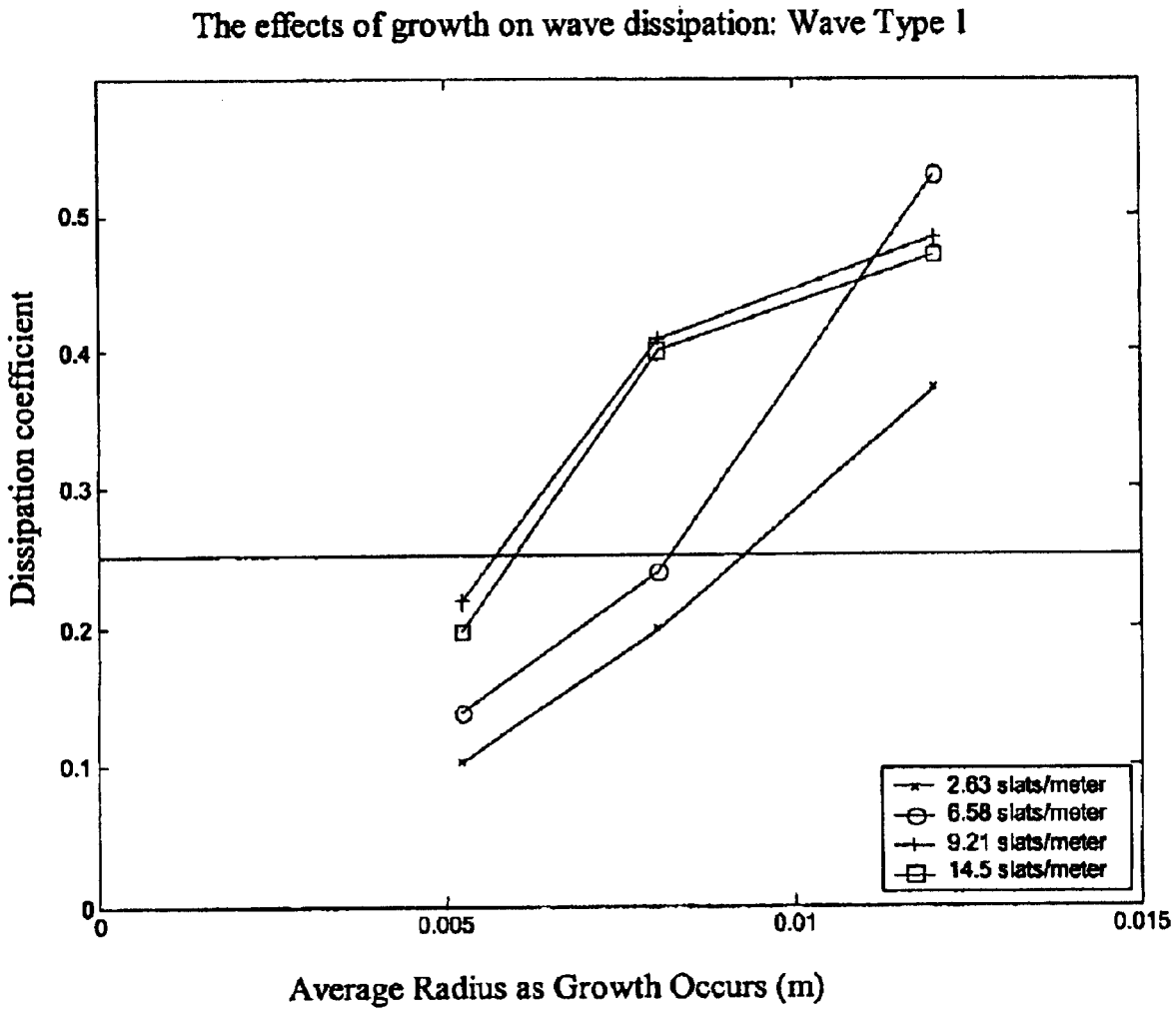
FIG. 18 is a graph plotting the dissipation coefficients of four different oysterbreak structures as a function of radius as growth occurs for each of the structures under wave type 1 conditions.

FIG. 18 is a graph depicting the dissipation coefficients as growth occurs for each of the structures under wave type 1. Oysterbreak values were compared with the physical breakwater values. The 9.21 slats/m and 14.5 slats/m oysterbreak structures 52 performed the same. In general, the wave dissipation increased to a maximum as growth occurred. From the initial to the final growth stages, the wave dissipation increased and approached a value of 0.50. The 2.63 slats/m and 6.58 slats/m oysterbreak structures 52 performed similarly in the initial and intermediate growth stages, but in the final growth stage were significantly different (p=0.0349, df=6). The values were less than those for the physical breakwater, 0.253, in the initial growth stages. The values were the same for the 9.21 slats/m and 14.5 slats/m structures 52 in the intermediate growth stages, with values of 0.40. All of the oysterbreak structures 52 were superior to the physical breakwater at dissipating wave energy in the final growth stages, although the 6.58 slats/m oysterbreak structure 52 had a much higher value of 0.530. Table 6 shows the average and standard deviation of the dissipation coefficient for each oysterbreak structure 52 tested under wave type 1.

TABLE 6

| Wave Type 1 | | |
|---|---|---|
| Radial Growth (m) | Slats/meter | Dissipation Coefficient |
| 0.005 | 2.63 | 0.103 ± 0.088 |
| 0.005 | 6.58 | 0.138 ± 0.073 |
| 0.005 | 9.21 | 0.219 ± 0.093 |
| 0.005 | 14.47 | 0.197 ± 0.092 |
| 0.008 | 2.63 | 0.198 ± 0.118 |
| 0.008 | 6.58 | 0.241 ± 0.084 |
| 0.008 | 9.21 | 0.401 ± 0.100 |
| 0.008 | 14.47 | 0.400 ± 0.093 |
| 0.012 | 2.63 | 0.374 ± 0.041 |
| 0.012 | 6.58 | 0.530 ± 0.130 |
| 0.012 | 9.21 | 0.482 ± 0.076 |
| 0.012 | 14.47 | 0.469 ± 0.082 |
| Physical Rock Breakwater | | 0.253 ± 0.177 |

Figure 19:
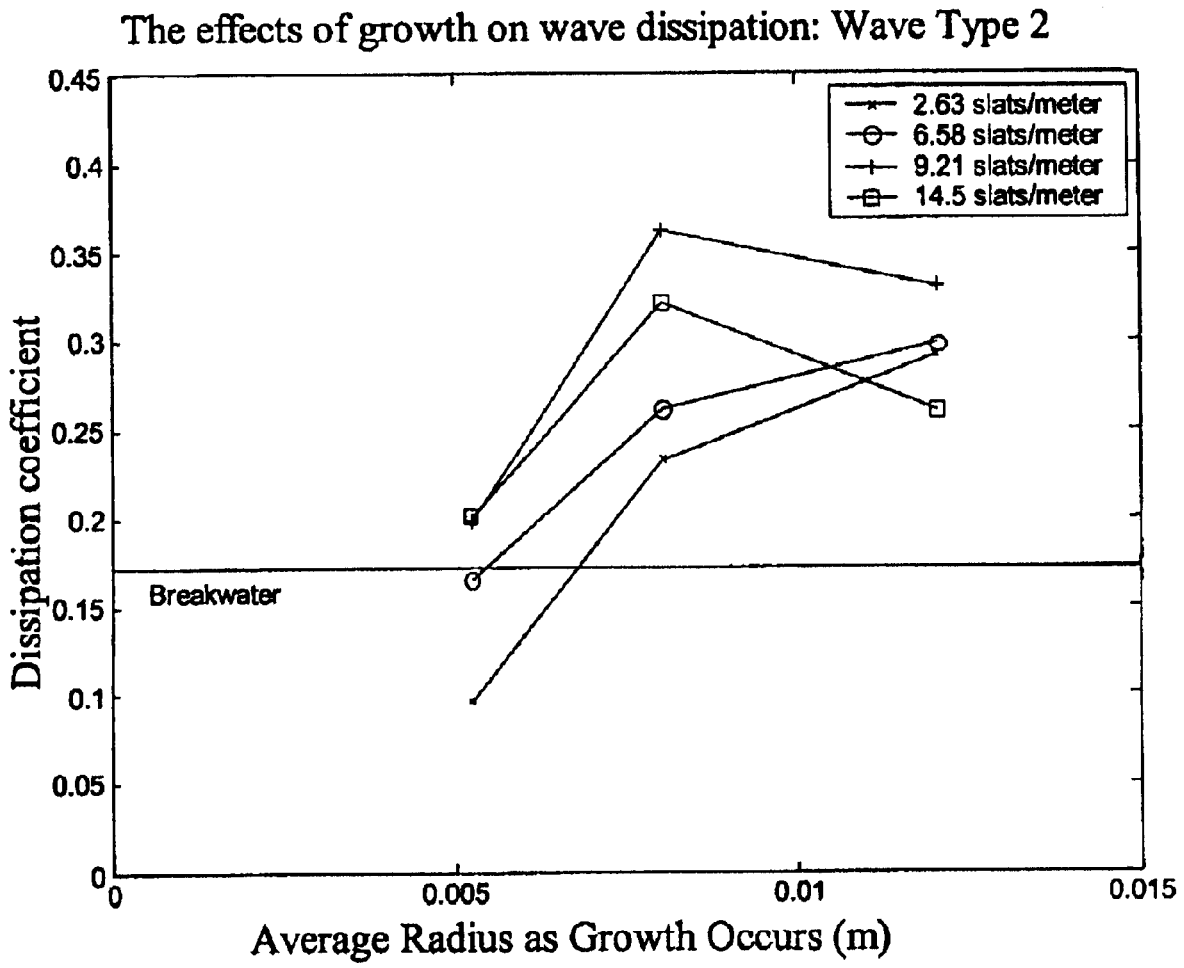
FIG. 19 is a graph plotting the dissipation coefficients of four different oysterbreak structures as a function of radius as growth occurs for each of the structures under wave type 2 conditions.

FIG. 19 is a graph depicting the dissipation coefficients as growth occurs for each of the oysterbreak structures 52 under wave type 2. Oysterbreak values are compared with the physical breakwater values. The difference in wave dissipation was more distinct between structures. In the initial growth stage, the dissipation coefficient of the physical breakwater was 0.172. The 6.58 slats/m, 9.21 slats/m, and 14.5 slats/m oysterbreak structures 52 similarly had ion coefficients of 0.138, 0.219, and 0.197, respectively. The dissipation coefficient of the 2.63 slats/m oysterbreak structure 52, 0.103, was less than the other oysterbreak structures 52. In the intermediate growth stage, the dissipation coefficient of the 9.21 slats/m oysterbreak structure 52 was the highest (0.401), while that of the 2.63 slats/m oysterbreak structure 52 was the lowest (0.198). In the final growth stage, the dissipation coefficient values for the structures stabilized at about 0.30, which was higher than the dissipation coefficient for the physical breakwater value of 0.17. Table 7 shows the average and standard deviation of the dissipation coefficient for each of the oysterbreak structures 52 tested under wave type 2.

TABLE 7

| Wave Type 2 | | |
|---|---|---|
| Radial Growth (m) | Slats/meter | Dissipation Coefficient |
| 0.005 | 2.63 | 0.096 ± 0.028 |
| 0.005 | 6.58 | 0.166 ± 0.048 |
| 0.005 | 9.21 | 0.199 ± 0.061 |
| 0.005 | 14.47 | 0.200 ± 0.105 |
| 0.008 | 2.63 | 0.233 ± 0.049 |
| 0.008 | 6.58 | 0.262 ± 0.038 |
| 0.008 | 9.21 | 0.362 ± 0.082 |
| 0.008 | 14.47 | 0.322 ± 0.086 |
| 0.012 | 2.63 | 0.292 ± 0.077 |

TABLE 7-continued

| Wave Type 2 | | |
|---|---|---|
| Radial Growth (m) | Slats/meter | Dissipation Coefficient |
| 0.012 | 6.58 | 0.298 ± 0.089 |
| 0.012 | 9.21 | 0.331 ± 0.147 |
| 0.012 | 14.47 | 0.261 ± 0.085 |
| Physical Rock Breakwater | | 0.172 ± 0.041 |

The results of the wave tank experiments demonstrate that wave transmission decreases as growth occurs. However, transmission does not necessarily decrease as slats are added to the oysterbreak structure 52. A regression model was run to describe the transmission as the growth and slats/m are manipulated. The following equation was found for the transmission coefficient in wave condition 1 to have an $R^2$ value of 0.683:

$$K_t=1.172-28.119r-0.026\psi+0.001\psi^2 \quad \text{Eq. 9}$$

This equation represents the transmission coefficient, $K_t$, where "r" is growth and "ψ" is the slats/m on the structure. Another equation was found for the transmission coefficient in wave type 2 to have an $R^2$ value of 0.735:

$$K_t=1.1115-21.950r-0.021\psi+0.001\psi^2 \quad \text{Eq. 10}$$

Eqs. 9 and 10 both include an optimum number of slats/m. In practice, the most feasible design minimizes the number of slats/m required, while maximizing the efficiency in reducing wave energy. In addition, the various numbers of slats/m have almost the same transmission coefficient as the oysterbreak accumulates growth and matures. Therefore, the optimal design would have to balance the cost with how fast the final transmission coefficient was needed for a specific situation. The majority of final growth stage values approached the predicted values of a comparable size rock breakwater using Ahrens' model. Thus, for design purposes Ahrens' model can be used to predict wave transmission at the final growth stage.

Conservative results may have been produced when the oysterbreak structures were introduced causing the breaking waves to move toward the pressure sensors. When the waves steepened and broke, they were over the pressure sensors. This may have produced results that were more conservative than those found in other studies (e.g., Ahrens, 1987). These values were compared under the same conditions to maintain consistency.

The reflection and dissipation coefficients were affected in addition to the overall porosity of the structures affecting wave transmissions. The reflection coefficients increased due to an increase in density and growth. The 6.58 slats/m and 9.21 slats/m tube-based oysterbreak structures 52 produced similar reflection coefficients in both wave conditions. This may have been caused by reflected waves not penetrating deep into the oysterbreak structure before being reflected. Therefore, the number of slats per meter did not substantially affect the reflection coefficients.

On the other hand, there appeared to be an optimum design for the maximum wave dissipation. As the slats/m were increased in the tube-based oysterbreak structure 52, wave dissipation increased to an optimal number of slats to effectively decrease the waves. Therefore, dense structures may not be needed to achieve desired wave dissipation. That is, the 9.21 slats/meter structure seemed to be the optimum design for the tube-based oysterbreak. Independent of structure type, the dissipation coefficient seemed to reach a maximum in both wave conditions.

EXAMPLE 6

Development of a Predictive Model

Oysterbreak Transmission Number

Figure 20:
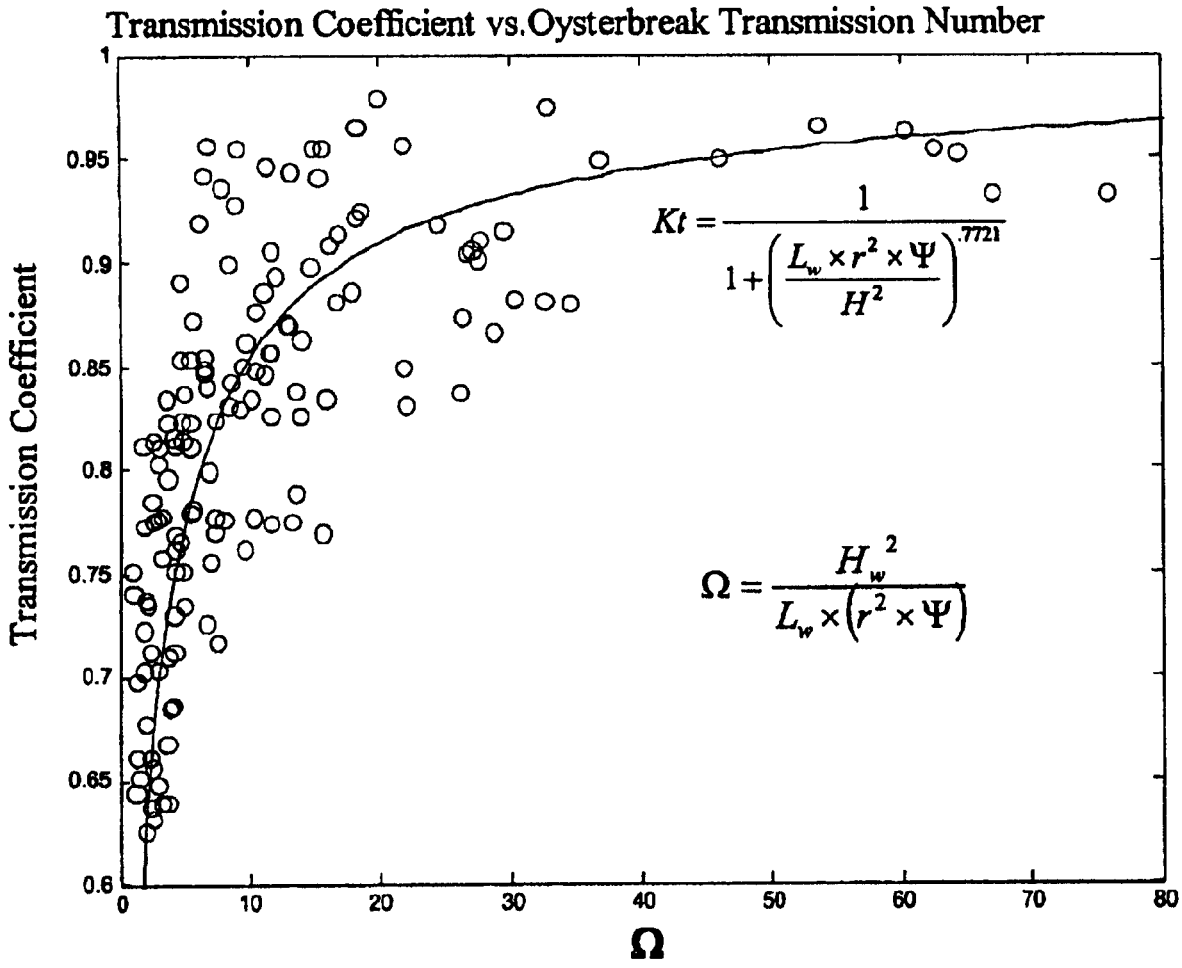
FIG. 20 is a graph plotting transmission coefficient as a function of the oysterbreak transmission number (Ω).

To relate the results from the wave tank experiments, a dimensionless number, referred to as the oysterbreak transmission number "Ω" was developed. The oysterbreak transmission number relates the wave height, wave length, growth stage, and density of the structure. The transmission coefficient was plotted with respect to the oysterbreak transmission number, as shown in FIG. 20, to determine if there existed a relationship between the two numbers. An equation was created, which successfully describes that relationship as expressed in Eq. 4.1.

$$Kt = \frac{1}{1 + \left(\frac{L_w \times r^2 \times \Psi}{H^2}\right)^{.7721}} \qquad \text{Eq. 4.1}$$

It was found that the transmission coefficient, Kt, was related to the wave height (m), $H_w$, wave length (m), $L_w$, radial growth on the horizontal bars (m), r, and the number of slats per meter inside the oysterbreak, ψ.

The Predictive Capacity

Figure 21:
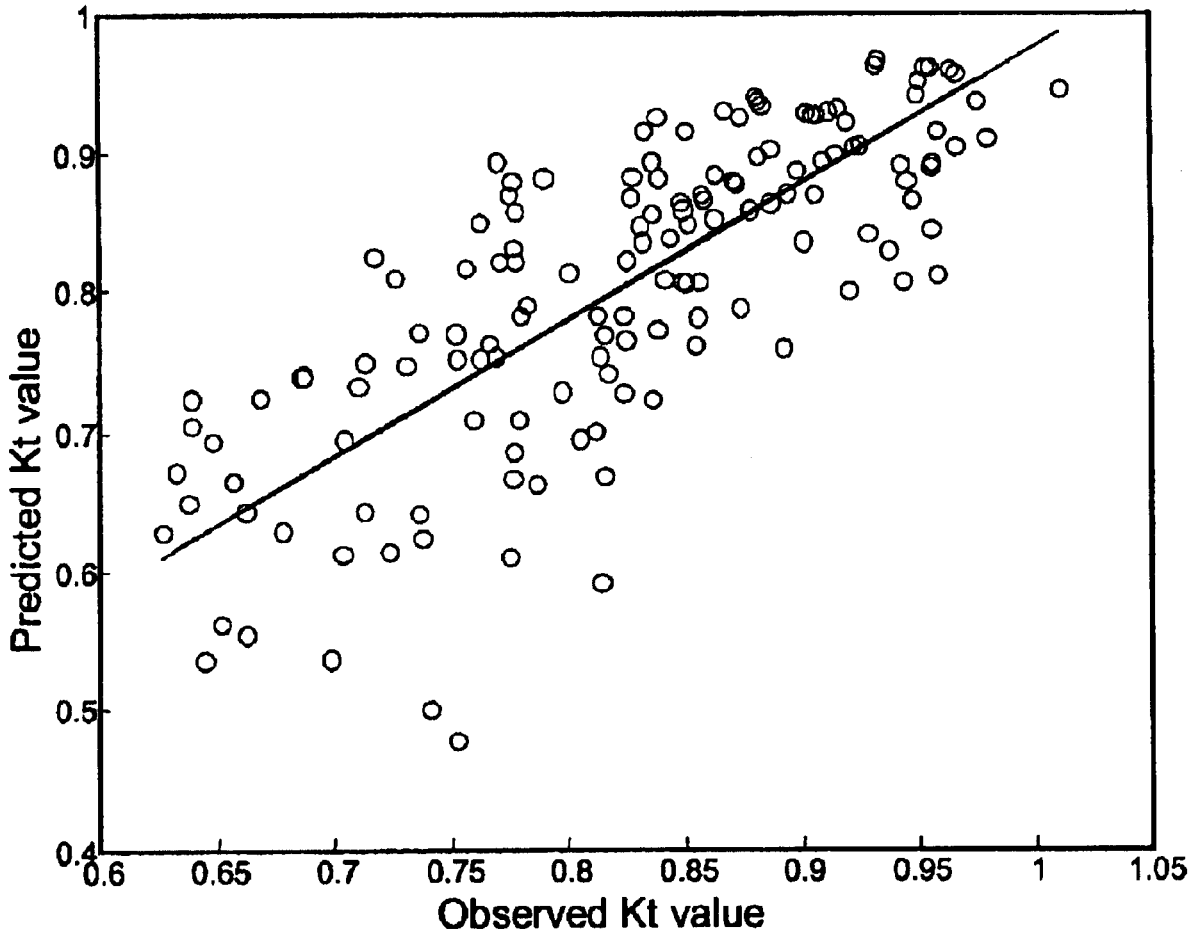
FIG. 21 is a graph plotting the correlation between the observed value and the predicted value.
Figure 22:
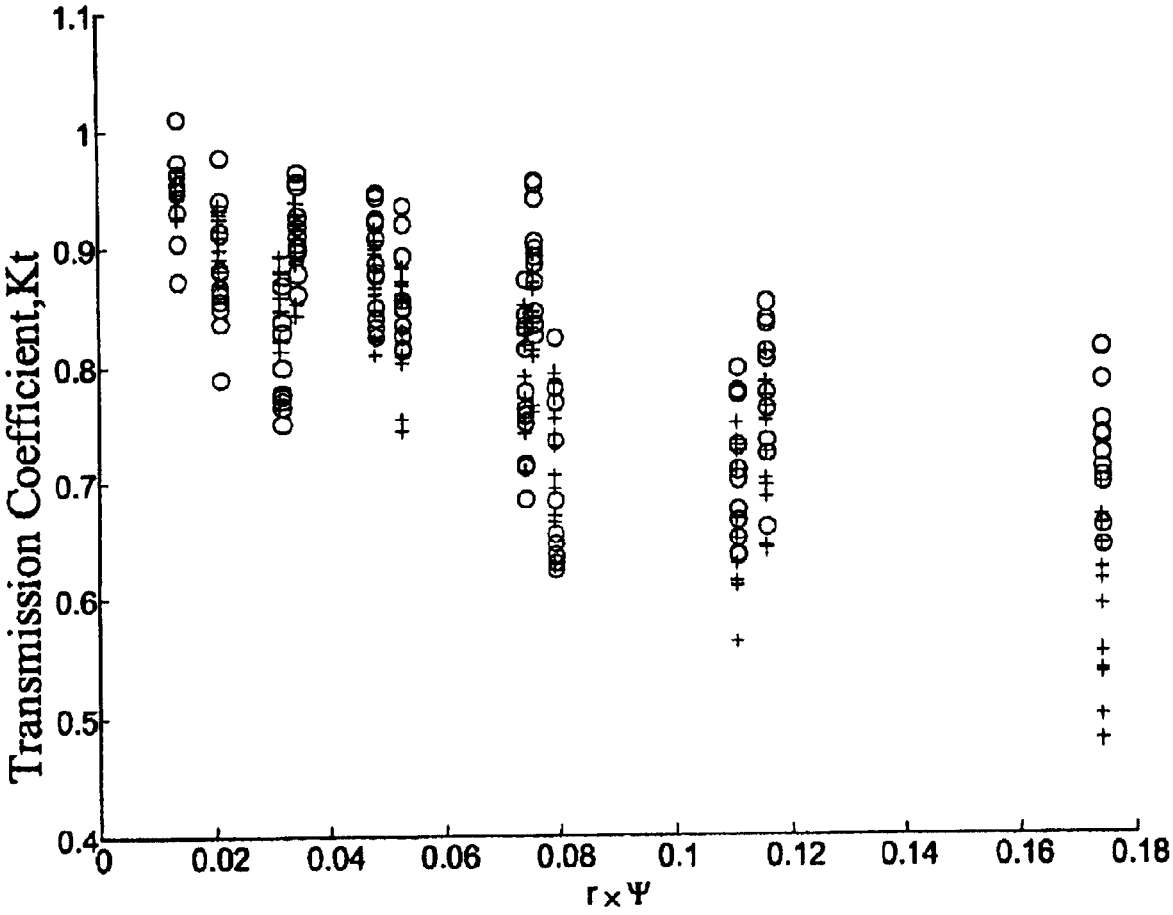
FIG. 22 is a graph plotting predicted transmission coefficient values (+) and observed transmission coefficient values (o) as a function of radial growth and density.

Eq. 4.1 was used to calculate predicted values of the wave tank conditions. These values were compared to observed values from the experiments. A linear regression calculation was performed comparing predicted values to observed values, which resulted in a $R^2$ value of 0.58, as shown in FIG. 21. Scattered data points in the plot resulted from the physical parameters in the wave tank. Reflection from the sides of the tank caused a variation in wave height readings. The slope of the bottom of the tank varied slightly for each experimental run. A plot was also made of the observed values and the predicted transmission coefficient values versus an overall density change (r×ψ). Transmission coefficient values were observed to correlate at lower densities. Nonetheless, predicted transmission values for the highest density oysterbreak structures were generally lower than the observed values, as shown in FIG. 22. (Density is determined by the amount of growth and the number of slats on each oysterbreak structure.) Because the oysterbreak structures in the wave tank were of a specific crest width, Eq. 4.1 can only be used as a predictive model for that particular wave crest length. However, Ahrens' predictive model takes into account the other structural parameters (Eq. 4.2).

$$Kt = \frac{1}{1.0 + \left(\frac{h_c}{d_1}\right)^{1.188}\left(\frac{A_t}{d_s L_p}\right)^{0.261} \exp\left[1.529\left(\frac{F}{H_{mo}}\right) + 0.00551\left(\frac{A_t^{3/2}}{d_{50}^2 L_p}\right)\right]} \qquad \text{Eq. 4.2}$$

Eq. 4.2 is valid for $$\frac{F}{H_{mo}} < 1.0.$$

The transmission coefficient, $K_t$, is inversely proportional to a set of dimensionless numbers. The ratio of crest height of the structure, $h_c$, to depth of submergence at the toe of the structure, $d_s$, is the first term. The second term is the ratio of total area of the cross-section of the structure, $A_t$, to the depth of submergence and wave length, $L_p$. The third term is an exponential of two additive terms. The first term, being a ratio of freeboard, F, to incident wave height, $H_{mo}$, is a common ratio when relating structure height. The second additive term is a ratio of the area of the cross-section of the structure to the mean stone diameter, $d_{50}$, and the wave length.

If the oysterbreak predictive model is to be compared with Ahrens' model, a few assumptions must be made. First, it was assumed that the percent difference of how the oysterbreak performs relative to the predicted value of Ahrens' remained the same for all wave conditions. Second, it was assumed that the spacing of the horizontal bars directly correlated with the mean stone diameter in Ahrens' model. Third, it was assumed that the density of the oysterbreak produced transmission coefficient values equal to those predicted by Ahrens' for the oysterbreak minimum transmission coefficients.

The relationship between the wave tank experiments and the field conditions was necessary to utilize this model. To do this, Ahrens' model was incorporated into the current field model. The relationship is as follows:

$$Kt = \text{Ahrens}_{\text{field}} + (1 - \text{Ahrens}_{\text{field}})\left(\frac{(1 - \text{Ahrens}_{\text{wave tank}}) - (1 - K_{tw})}{(1 - \text{Ahrens}_{\text{wave tank}})}\right) \qquad \text{Eq. 4.3}$$

where $K_t$ is the predicted value in the field conditions and $K_{tw}$ is the predicted value in the wave tank. In Eq. 4.3, it is assumed that the percent difference between the oysterbreak values and Ahrens' predicted values remains the same for variations in structure dimensions and wave type. This equation predicts the transmission coefficient in the field, $K_t$. Ahrens' predicted value for the field is used to size the structure and to determine the transmission value. Adjustments are made to this value using a percent difference ratio established in the wave tank. In conclusion, a predictive model was made to predict the transmission coefficient of different conditions over time.

EXAMPLE 7

Construction of the Prototype Module Oysterbreak

The prototype module oysterbreak was made by first building a hexagonally-shape casting form using 2 in×4 in yellow pine boards. The outer surface of the hexagonally-shaped pattern was made by cutting several boards into 36.37 in long sections. The ends of the sections were cut at 120° angles, and then nailed together. Then, six triangular openings were made by cutting several of the boards into 25.4 in sections, with ends having 60° angles to form triangles. These sections were then nailed together and placed inside the hexagon. The hexagon and triangle patterns were then attached to a 73 in×68 in plywood. Two-inch PVC pipe were then placed in the corners of each hexagonal pattern to form holes for attachment of each hexagon. Table 8 describes the cement formula used for manufacturing the module oysterbreak. The cement formula was mixed in a 3½ cubic foot electric cement mixer manufactured by Central MACHINERY®, purchased at Harbor Freight in Baton Rouge, La.

TABLE 8

| | |
|---|---|
| Portland Cement | 16 lb |
| Water | 5.28 lb |
| Sand | 24 lb |
| #7 Limestone gravel | 16 lb |
| #89 Limestone gravel | 35 lb |
| ¼" Dolomite | 1 lb |
| Cottonseed | 0.5 lb |
| Products from Degussa AdMixtures, Inc., Cleveland, OH | |
| Accelerator | 29.056 mL |
| PS 1466 | 72.64 mL |
| VMA 362 | 50.848 mL |

Figure 2B:
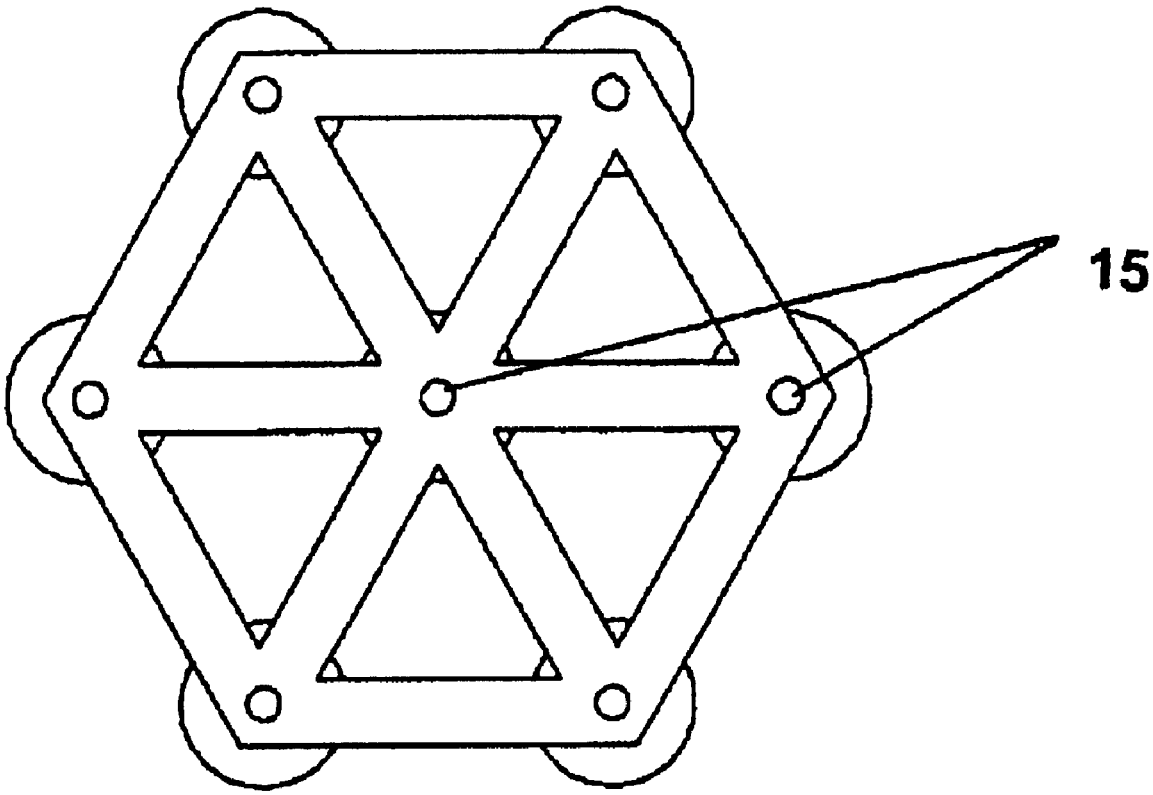
FIG. 2B is a top view of one embodiment of a hexagonally-shaped member of the module oysterbreak
Figure 2C:
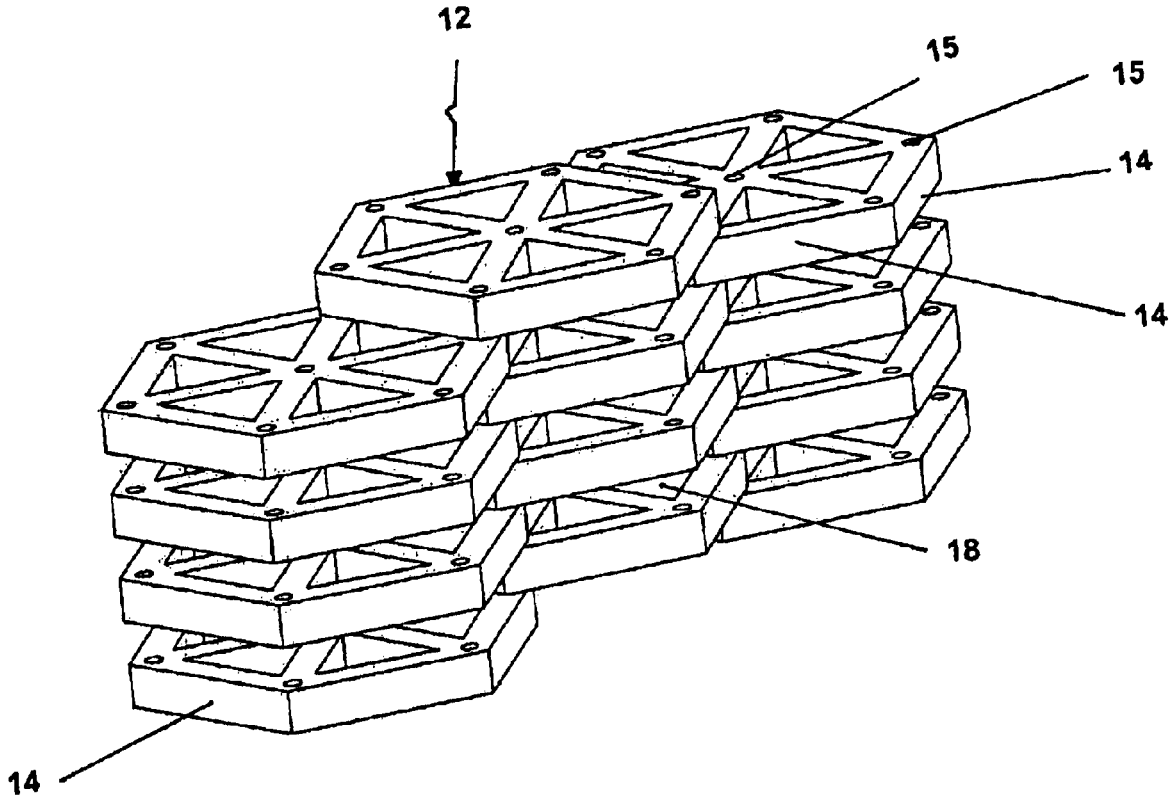
FIG. 2C is a perspective view of a plurality of hexagonally-shape members placed adjacent to each and stacked to form one embodiment of the module oysterbreak.

Next, the cement mixture was poured into the form and covered with plastic for two days, and then the pattern was released to form the prototype module oysterbreak, as shown in FIG. 2B (without spacers 16).

EXAMPLE 8

Future Testing of the Constructed Module Oysterbreak

Prototypes of the module oysterbreak will be constructed similar to the description in Example 7. Once constructed, evaluations will be conducted to determine the effectiveness of the module oysterbreak. These evaluations will proceed in two parts. In the first part of the evaluation, which will be conducted on a prototype scale (50 ft×600 ft structure) using the staggered, module oysterbreak similar to the design shown in FIG. 2C to determine the effectiveness of the design, deployment capability, and applicability at the designated study site. In the second part of the evaluation, a large-scale operation will be implemented using the same scale as adjacent submerged rock breakwaters described in Example 5.

Monitoring of the large-scale operation will be conducted over a 5-year period. Wave dissipation and shoreline will be evaluated on a monthly basis. Oyster growth will be measured by size, abundance, health (i.e. disease proliferation), and predation. Environmental parameters such as water temperature, salinity, and turbidity will also be measured. The design will also be evaluated on its ability to survive and successfully inhibit erosion in the field.

In addition to the wave dissipation characteristics, the oysterbreak will be designed to attract a maximum number of oysters. A few preliminary experiments have been conducted with various mixtures of cement and additives such as cottonseed, oyster shell and a foaming agent. However, additional studies are needed to determine the effectiveness of the mixture of cottonseed and cement. Further testing will also be conducted to determine if a relationship exists between the growth of the oysters on the oysterbreak, strength of oysterbreak, wave dissipation and shoreline changes.

CONCLUSION

Settlement Patterns

Effective oysterbreak design depends on depth of knowledge of physical and biological processes. It is important to understand how to alter the design for various environments and desired outcomes. The Louisiana coastal areas are ideal environments for oyster growth. The results from Grand Isle, La. show the impact that predation can produce on growth patterns. In the absence of such predation pressure, a uniform growth pattern may be expected. The upper regions of coastal bays have a lower salinity where oyster drill populations are minimal if not nonexistent. In these areas, one would expect a significant increase in growth and survival. These are areas where the oysterbreak would be very successful. Future research should include the deployment of multiple oysterbreaks in areas of optimal growth conditions, which would produce knowledge of the system dynamics and resilience of this kind of artificially-induced ecosystem. Future research should also include selecting good fouling materials for oysterbreak construction. Other future research should include the effects of growth on shoreline change.

Wave Interaction

The wave interaction characteristics of the tube-based oysterbreak were determined in the wave tank experiments. The wave transmission coefficients were determined to decrease as growth occurred on the structures. The reflection coefficients increased as growth occurred on the structures. Most importantly the dissipation coefficients increased as growth occurred and a maximum value was achieved.

For design purposes, the Ahrens' predictive model can be used in the design of an oysterbreak. The tube-based oysterbreak transmission coefficients achieved similar values as the predicted Ahrens' values at the final growth stage. An oysterbreak will reduce wave energy at a mature growth stage very similar (or perhaps better due to vertical growth of oysters) to a rock submerged breakwater. Therefore, Ahrens' model may be used to size the oysterbreak for specific wave conditions.

Additionally, there was a maximum number of slats/m needed to effectively dissipate wave energy. The 9.21 slats/meter model tube-based oysterbreak structure was the most effective at dissipating wave energy for both wave conditions tested. It was also shown that a full size structure with two vertical slats/m could be used to effectively dissipate waves.

Modeling

The model developed through this correlates well with the results from the wave tank. The model would have to be verified in the field to determine its predictive capacity. None of the variables seemed to reveal any unexpected results. The spacing of the horizontal beams would have to be investigated more to support the assumption that the mean stone diameter correlates with it. The increase in height due to vertical migration of oyster growth should be developed further in the model. As a whole, the model seemed to fit the data fairly well for the lower to intermediate densities. The higher densities were assumed to follow Ahrens' predicted values. Also, a vertical growth component should be added into the model, which will cause the transmission to decrease further.

The complete disclosures of all references cited in this specification are hereby incorporated by reference. Also incorporated by reference is the following publication of the inventors' own work: M. Campbell, et al., "Analysis and Evaluation of a Bioengineered Submerged Breakwater," (published thesis) on file with the Louisiana State University Library (December, 2004). In the event of an otherwise irreconcilable conflict, however, the present specification shall control.

We claim:

1. An apparatus comprising a plurality of adjacent columns, wherein:

(a) each of said columns is adapted to be placed vertically on the bed of a water body;

(b) each of said columns comprises a plurality of horizontal growth layers, interspersed vertically with a plurality of horizontal wave port layers; and each of said columns further comprises a plurality of connectors;

(c) each of said horizontal growth layers has an approximately regular polygonal cross-section, with spokes extending inward from the vertices of the regular polygon and joining near the center of the regular polygon to provide mechanical strength to said horizontal growth layer;

(d) each of said horizontal growth layers does not permit the flow of water through said growth layer in a horizontal direction, but does permit the flow of water through said growth layer in a vertical direction through internal spaces between the regular polygon and the spokes;

(e) vertically adjacent horizontal growth layers are mechanically joined to one another by a plurality of said connectors, wherein said connectors are located generally within the wave port layers;

(f) the horizontal wave port layers are generally open to the flow of water;

(g) the surfaces of said horizontal growth layers comprise a material that is adapted to attract and encourage the growth of sessile aquatic organisms; and (h) said apparatus is adapted to substantially reduce the wave energy or current energy of aquatic waves or aquatic currents that pass through said apparatus when sessile aquatic organisms are attached to said apparatus.

2. An apparatus as recited in claim 1, wherein said connectors for a column comprise portions of said horizontal growth layers from adjacent columns.

3. An apparatus as recited in claim 1, wherein adjacent said columns are mechanically joined to one another.

4. An apparatus as recited in claim 1, wherein said horizontal growth layers comprise a mixture of concrete and biomass; wherein said biomass will release ammonia upon decomposing in an aqueous environment, thereby attracting and encouraging the growth of sessile aquatic organisms.

5. An apparatus as recited in claim 1, wherein said horizontal growth layers comprise a mixture of concrete and biomass; wherein said biomass is selected from the group consisting of cottonseed, soybean, milo, agriculture waste, fertilizer, and mulch.

6. An apparatus as recited in claim 1, wherein said horizontal growth layers comprise a mixture of concrete and cottonseed.

7. An apparatus as recited in claim 1, wherein the regular polygonal cross-section is selected from the group of cross-sections consisting of a regular triangle, regular quadrilateral, regular pentagon, regular hexagon, regular heptagon, and regular octagon.

8. An apparatus as recited in claim 1, wherein the regular polygonal cross-section is regular hexagon.

9. An apparatus comprising a plurality of adjacent columns, wherein:

(a) each of said columns is adapted to be placed vertically on the bed of a water body;

(b) each of said columns comprises a plurality of horizontal growth layers, interspersed vertically with a plurality of horizontal wave port layers;

(c) each of said horizontal growth layers has an approximately regular polygonal cross-section, with spokes extending inward from the vertices of the regular polygon and joining near the center of the regular polygon to provide mechanical strength to said horizontal growth layer;

(d) each of said horizontal growth layers does not permit the flow of water through said growth layer in a horizontal direction, but does permit the flow of water through said growth layer in a vertical direction through internal spaces between the regular polygon and the spokes;

(e) the horizontal wave port layers are generally open to the flow of water;

(f) the surfaces of said horizontal growth layers comprise a material that is adapted to attract and encourage the growth of sessile aquatic organisms; and (g) said apparatus is adapted to substantially reduce the wave energy or current energy of aquatic waves or aquatic currents that pass through said apparatus when sessile aquatic organisms are attached to said apparatus.

10. An apparatus as recited in claim 9, wherein each of said vertical columns comprises portions of the vertically adjacent horizontal growth layers to form a plurality of staggered columns and wave ports.

11. An apparatus as recited in claim 9, wherein adjacent said columns are mechanically joined to one another.

12. An apparatus as recited in claim 9, wherein said horizontal growth layers comprise a mixture of concrete and biomass; wherein said biomass will release ammonia upon decomposing in an aqueous environment, thereby attracting and encouraging the growth of sessile aquatic organisms.

13. An apparatus as recited in claim 9, wherein said horizontal growth layers comprise a mixture of concrete and biomass; wherein said biomass is selected from the group consisting of cottonseed, soybean, milo, agriculture waste, fertilizer, and mulch.

14. An apparatus as recited in claim 9, wherein said horizontal growth layers comprise a mixture of concrete and cottonseed.

15. An apparatus as recited in claim 9, wherein the regular polygonal cross-section is selected from the group of cross-sections consisting of a regular triangle, regular quadrilateral, regular pentagon, regular hexagon, regular heptagon, and regular octagon.

16. An apparatus as recited in claim 9, wherein the regular polygonal cross-section is regular hexagon.

17. A method for reducing the wave energy or current energy of aquatic waves or aquatic currents in a water body; said method comprising placing, in the path of prevailing waves or currents in the water body, a structure that is adapted to reduce the wave energy or current energy of aquatic waves or aquatic currents; and allowing sessile aquatic organisms to grow upon the structure; wherein:

(a) the structure is adapted to attract and encourage the growth of sessile aquatic organisms;

(b) the structure reduces wave energy or current energy of aquatic waves or aquatic currents to a substantially greater extent after sessile aquatic organisms have grown upon the structure than it would if sessile aquatic organisms were absent from the structure;

(c) the structure comprises a mixture of concrete and biomass; wherein said biomass will, on decomposing in an aqueous environment, release ammonia, thereby attracting and encouraging the growth of sessile aquatic organisms to a substantially greater degree than would be the case for an otherwise identical structure lacking such ammonia-releasing biomass.

18. A method as recited in claim 17, wherein the structure comprises a mixture of concrete and biomass; wherein the biomass is selected from the group consisting of cottonseed, soybean, milo, agriculture waste, fertilizer, and mulch.

19. A method as recited in claim 17, wherein the structure comprises a mixture of concrete and cottonseed.

*20. An apparatus comprising a plurality of adjacent columns, wherein:*

*(a) each of said columns is adapted to be placed vertically on the bed of a water body;*

*(b) each of said columns comprises a plurality of horizontal growth layers, interspersed vertically with a plurality of horizontal wave port layers; and each of said columns further comprises a plurality of connectors;*

*(c) each of said horizontal growth layers has a perimeter and at least one internal space within the perimeter;*

*(d) each of said horizontal growth layers in each of said columns does not permit the flow of water through said growth layer in a horizontal direction, but does permit the flow of water in a vertical direction through said at least one internal space within the perimeter of said growth layers;*

*(e) vertically adjacent horizontal growth layers are mechanically joined to one another by a plurality of said connectors, wherein said connectors are located generally within the wave port layers;*

*(f) the horizontal wave port layers in each of said columns are generally open to the flow of water;*

*(g) the surfaces of said horizontal growth layers comprise a material that is adapted to attract and encourage the growth of sessile aquatic organisms; and*

*(h) said apparatus is adapted to substantially reduce the wave energy or current energy of aquatic waves or aquatic currents that pass through said apparatus when sessile aquatic organisms are attached to said apparatus.*

*21. An apparatus as recited in claim 20, wherein said connectors for a column comprise portions of said horizontal growth layers from adjacent columns.*

*22. An apparatus as recited in claim 20, wherein adjacent said columns are mechanically joined to one another.*

*23. An apparatus as recited in claim 20, wherein said horizontal growth layers comprise a mixture of concrete and biomass; wherein said biomass will release ammonia upon decomposing in an aqueous environment, thereby attracting and encouraging the growth of sessile aquatic organisms.*

*24. An apparatus as recited in claim 20, wherein said horizontal growth layers comprise a mixture of concrete and biomass; wherein said biomass is selected from the group consisting of cottonseed, soybean, milo, agriculture waste, fertilizer, and mulch.*

*25. An apparatus as recited in claim 20, wherein said horizontal growth layers comprise a mixture of concrete and cottonseed.*

*26. An apparatus as recited in claim 20, wherein the columns comprise a regular polygonal cross-section selected from the group of cross-sections consisting of a regular triangle, regular quadrilateral, regular pentagon, regular hexagon, regular heptagon, and regular octagon.*

*27. An apparatus as recited in claim 20, wherein the columns comprise a regular hexagonal cross-section.*

*28. The apparatus as recited in claim 20, the apparatus further comprising spokes extending inward from the perimeter of at least one horizontal growth layer, the spokes joining near the center of the growth layer to provide mechanical strength to said horizontal growth layer and wherein the flow of water through said growth layer in a vertical direction occurs through internal spaces between the growth layer perimeter and the spokes.*

*29. An apparatus comprising a plurality of adjacent columns, wherein:*

*(a) each of said columns is adapted to be placed vertically on the bed of a water body;*

*(b) each of said columns comprises a plurality of horizontal growth layers, interspersed vertically with a plurality of horizontal wave port layers;*

*(c) each of said horizontal growth layers has a perimeter and at least one internal space within the perimeter;*

*(d) each of said horizontal growth layers in each of said columns does not permit the flow of water through said growth layer in a horizontal direction, but does permit the flow of water in a vertical direction through said at least one internal space within the perimeter of said growth layers;*

*(e) the horizontal wave port layers are generally open to the flow of water;*

*(f) the surfaces of said horizontal growth layers comprise a material that is adapted to attract and encourage the growth of sessile aquatic organisms; and*

*(g) said apparatus is adapted to substantially reduce the wave energy or current energy of aquatic waves or aquatic currents that pass through said apparatus when sessile aquatic organisms are attached to said apparatus.*

*30. An apparatus as recited in claim 29, wherein each of said vertical columns comprises portions of the vertically adjacent horizontal growth layers to form a plurality of staggered columns and wave ports.*

*31. An apparatus as recited in claim 29, wherein adjacent said columns are mechanically joined to one another.*

*32. An apparatus as recited in claim 29, wherein said horizontal growth layers comprise a mixture of concrete and biomass; wherein said biomass will release ammonia upon decomposing in an aqueous environment, thereby attracting and encouraging the growth of sessile aquatic organisms.*

*33. An apparatus as recited in claim 29, wherein said horizontal growth layers comprise a mixture of concrete and biomass; wherein said biomass is selected from the group consisting of cottonseed, soybean, milo, agriculture waste, fertilizer, and mulch.*

*34. An apparatus as recited in claim 29, wherein said horizontal growth layers comprise a mixture of concrete and cottonseed.*

*35. An apparatus as recited in claim 29, wherein the columns comprise a regular polygonal cross-section selected from the group of cross-sections consisting of a regular triangle, regular quadrilateral, regular pentagon, regular hexagon, regular heptagon, and regular octagon.*

*36. An apparatus as recited in claim 29, wherein the columns comprise a regular hexagonal cross-section.*

*37. The apparatus as recited in claim 29, the apparatus further comprising spokes extending inward from the perimeter of at least one horizontal growth layer, the spokes joining near the center of the growth layer to provide mechanical strength to said horizontal growth layer and wherein the flow of water through said growth layer in a vertical direction occurs through internal spaces between the growth layer perimeter and the spokes.*

* * * * *